(12) United States Patent
Schilling et al.

(10) Patent No.: US 11,072,711 B2
(45) Date of Patent: Jul. 27, 2021

(54) ELECTRICALLY CONDUCTIVE PARTICLES, COMPOSITION, ARTICLE AND METHOD OF MANUFACTURING ELECTRICALLY CONDUCTIVE PARTICLES

(71) Applicant: ECKART GmbH, Hartenstein (DE)

(72) Inventors: Christine Schilling, Hartenstein (DE); Stephanie Hiltl, Hartenstein (DE)

(73) Assignee: ECKART GMBH, Hartenstein (DE)

( * ) Notice: Subject to any disclaimer, the term of this patent is extended or adjusted under 35 U.S.C. 154(b) by 0 days.

(21) Appl. No.: 16/955,957

(22) PCT Filed: Dec. 21, 2018

(86) PCT No.: PCT/EP2018/086669
§ 371 (c)(1),
(2) Date: Jun. 19, 2020

(87) PCT Pub. No.: WO2019/122366
PCT Pub. Date: Jun. 27, 2019

(65) Prior Publication Data
US 2020/0332127 A1  Oct. 22, 2020

(30) Foreign Application Priority Data
Dec. 22, 2017 (EP) .................................... 17210226

(51) Int. Cl.
*H01B 1/22* (2006.01)
*C09C 1/00* (2006.01)
*C09C 1/64* (2006.01)

(52) U.S. Cl.
CPC .............. *C09C 1/648* (2013.01); *H01B 1/22* (2013.01); *C01P 2004/03* (2013.01);
(Continued)

(58) Field of Classification Search
CPC .. H01B 1/00; H01B 1/22; C09C 1/648; C01P 2004/32; C01P 2004/60
See application file for complete search history.

(56) References Cited

U.S. PATENT DOCUMENTS 6,761,762 B1  7/2004 Greiwe et al.
7,335,837 B2  2/2008 Pfeiler et al.
(Continued)

FOREIGN PATENT DOCUMENTS

CN    102124142 A    7/2011
DE    19820112 A1   11/1999
(Continued)

OTHER PUBLICATIONS

International Search Report and Written Opinion for International Application No. PCT/EP2018/086669 dated Apr. 4, 2019 (8 pages).
(Continued)

*Primary Examiner* — Mark Kopec
(74) *Attorney, Agent, or Firm* — Fitch, Even, Tabin & Flannery LLP

(57) ABSTRACT

The invention is directed to electrically conductive particles comprising a metallic core, a dielectric layer encapsulating said metallic core, and a silver containing outer-layer, wherein said metallic core comprises or consists of elemental metal selected from the group consisting of aluminum, copper, iron, nickel, zinc, and alloys, and mixtures thereof, said dielectric layer comprises at least one metal oxide selected from the group consisting of the group consisting of silicon oxide, aluminum oxide, titanium oxide, zirconium oxide, tin oxide, organic polymer, and mixtures thereof, wherein said silver containing layer is a continuous and opaque layer, wherein a silver ion coordinating layer is arranged between said dielectric layer and said silver containing layer and, optionally a further outer surface modification layer in amount of 0 to 3 wt.-%, based on the total
(Continued)

weight of the electrically conductive particles. The invention is also directed to a composition and an article comprising the electrically conductive particles as well as to a method for producing said electrically conductive particles.

19 Claims, 4 Drawing Sheets

(52) U.S. Cl.
CPC ...... *C01P 2004/32* (2013.01); *C01P 2004/61* (2013.01); *C01P 2004/80* (2013.01); *C01P 2006/40* (2013.01)

(56) References Cited

U.S. PATENT DOCUMENTS

| | | | |
|---|---|---|---|
| 9,000,068 B2 | 4/2015 | Trummer et al. | |
| 2005/0175836 A1 | 8/2005 | Kuehnle et al. | |
| 2007/0131912 A1 | 6/2007 | Simone et al. | |
| 2008/0318012 A1 | 12/2008 | Domnick et al. | |
| 2010/0090176 A1 | 4/2010 | Kosowsky et al. | |
| 2012/0301553 A1* | 11/2012 | Otterstedt | A01N 59/16 424/618 |
| 2013/0164356 A1* | 6/2013 | Pfaff | C09C 1/0024 424/401 |
| 2013/0171060 A1 | 7/2013 | Vo-Dinh et al. | |
| 2015/0262729 A1* | 9/2015 | Aoki | B22F 1/025 428/570 |
| 2016/0038618 A1 | 2/2016 | Halas et al. | |
| 2019/0382627 A1* | 12/2019 | Hu | H01B 13/0036 |

FOREIGN PATENT DOCUMENTS

| | | |
|---|---|---|
| EP | 0852977 A1 | 7/1998 |
| EP | 1780747 A2 | 5/2007 |
| EP | 1812519 B1 | 9/2008 |
| EP | 1990377 A1 | 11/2008 |
| TW | 200614274 A | 5/2006 |
| TW | 201126156 A1 | 8/2011 |
| WO | 2010107720 A2 | 9/2010 |
| WO | 2015073346 A1 | 5/2015 |

OTHER PUBLICATIONS

Linton, United States Statutory Invention Registration H1447 issued Jun. 6, 1995.

Wang et al., "Surface Thiolation of Al Microspheres to Deposite Thin and Compact Ag Shells for High Conductivity," American Chemical Society Publications, Langmuir 2015, 31, pp. 13441-13451.

Office Action for Chinese Application No. 201880075990.1 dated Mar. 15, 2021.

* cited by examiner

ELECTRICALLY CONDUCTIVE PARTICLES, COMPOSITION, ARTICLE AND METHOD OF MANUFACTURING ELECTRICALLY CONDUCTIVE PARTICLES

The invention is directed to electrically conductive particles comprising a metallic core, a dielectric layer encapsulating said metallic core, and a silver containing outer-layer. Moreover, the invention relates to a composition comprising said electrically conductive particles. The invention is also directed to a method of manufacturing electrically conductive particles as well as to an article comprising said electrically conductive particles.

Electrically conductive particles such as electrically conductive powders are useful in the manufacture of electronics assembly. For example, the electrically conductive particles or powders can be included in adhesives, coatings, display materials, etc. to render these materials electrically conductive.

US 2007/0131912 A1 discloses electrically conductive adhesives comprising a cured low modulus elastomer and metallurgically-bonded micron-sized metal particles and nano-sized metal particles. The electrically conductive adhesive can be used as an alternative to eutectic tin-lead solder and lead-free alloy solder as an interconnect material in the manufacture of, for example, printed circuits, etc. According to US 2007/0131912 A1 the nano particles and the micron particles are combined with an elastomer material. The curing of the elastomer material is to be effected at an elevated temperature at which the nano particles and the micron particles sinter to each other to provide a sufficient electrical conductivity in and to the elastomeric material. The metal particles are preferably silver particles. The use of silver particles of different sizes matched to each other is cumbersome and expensive. Moreover, the use of an elevated temperature allowing sintering of the silver particles is a significant disadvantage.

The United States Statutory Invention Registration H1447 is directed to a powder composition in which the individual particles of the powder comprise a hollow silica shell having a metal containing coating on the surface of the hollow silica shell. The particles are characterized by a lower density and a higher surface area, which allows employing the product composition as a catalyst. The product composition can also be used in electrical or photographic applications. Disadvantageously, the hollow silica shells are to be manufactured first. Moreover, the hollow silica particles have a rather low density which complicates the incorporation of these light-weighted particles into polymeric masses such as adhesives, sealants, etc. Finally, the hollow silica particles have a thermo-insulating effect leading a low heat dissipation or heat release. In electronic appliances it is an advantage if generated heat is quickly dissipated in order to avoid any damages to electronic components.

EP 0 852 977 B1 is directed to a powder having a multilayered metal oxide film on the surface of base particles, wherein said powder has any of bright colors. The powder is suitable for use as a magnetic coloring material in magnetic colored toners, magnetic color inks, etc. The base material on which the metal oxide films are applied can be selected from metal, metal oxides, metal nitrides, metal carbides, silica or glass beads.

EP 1 990 377 B1 is directed to a colored metallic pigment comprising at least a metallic pigment, an amorphous silicon oxide film layer on the surface of said metallic pigment, a metal layer provided on the surface of the amorphous silicon oxide film and metallic particles provided on the surface of the metal layer. The colored metallic pigments are capable of developing a variety of colors and a variety of interference colors while having an improved light resistance, weather resistance and hiding power. These colored metallic pigments are to be used in coating compositions and cosmetic preparations.

U.S. Pat. No. 8,067,090 B2 is directed to an effect pigment comprising a platelet-shaped metallic reflector core, a spacer layer of a dielectric material applied on the reflector core and a semitransparent absorber layer applied on the spacer layer and comprising absorber metal particles, which are essentially discrete, and having an average diameter of from 1 to 100 nm. The effect pigments are used in paints, varnishes, powder coatings, etc. In order to obtain the desired optical properties, it is necessary that the absorber metal particles do not form a continuous layer but are present in a nanoparticulate form.

WO 2015/073346 A1 is directed to an electrically conductive article comprising a composite comprising a resin and electrically conductive shaped particles distributed in the resin. The particles have a mono-sized distribution wherein each particle comprises a shape comprising at least a first surface and a second surface intersecting the first surface at an angle α between about 5 degrees and about 150 degrees. Preferably, these electrically conductive shaped particles comprise a shape comprising at least three surfaces meeting in a point. These elaborate specific geometric particles comprising a core and a metal coating are difficult to manufacture.

EP 1 780 747 A2 is directed to a conductive electrical powder comprising electrically conductive metal particles and an inorganic oxide coating layer covering the surface of the electrically conductive metal particles. The conductive electrical powder is then formed into an electrode. The inorganic oxide coating layer has insulating characteristics, which continuously prevent an electrode of a plasma display panel from corroding during its fabrication process. Later, the inorganic oxide coating layer is destroyed, for example, by pressure, when it is bonded with a tape carrier package (TCP) and the like during the mounting process, recovering electro-conductivity.

Wang Y. et al., "Surface Thiolation of Al Microspheres to Deposite Thin and Compact Ag Shells for High Conductivity", Langmuir 2015, 31, 13441-14451, discloses a method for controllable thiolated functionalization coupled with electroless silver plating to achieve aluminum-silver core-shell particles. Disadvantageously, the electrical conductivity of the silver plated aluminum spheres is not sufficient.

In the art there is a great demand for electrically conductive particles which can be used to render carrier materials, such as adhesives, sealants, etc. to become electrically conductive. Furthermore, the electrically conductive particles are preferably to be produced easily and in a cost effective manner.

The object underlying the invention is solved by providing electrically conductive particles comprising a metallic core, a dielectric layer encapsulating said metallic core, and a silver containing outer-layer, wherein said metallic core comprises or consists of elemental metal selected from the group consisting of aluminum, copper, iron, nickel, zinc, and alloys, and mixtures thereof, said dielectric layer comprises at least one metal oxide selected from the group consisting of silicon oxide, aluminum oxide, titanium oxide, zirconium oxide, tin oxide, organic polymer, and mixtures thereof, wherein said silver containing layer is a continuous and opaque layer, wherein a silver ion coordinating layer is arranged between said dielectric layer and said silver containing layer, and optionally a further outer surface modification layer in an amount of 0 to 3 wt.-%, based on the total weight of the electrically conductive particles.

Thus, the invention relates to an electrically conductive particles comprising a metallic core, a dielectric layer encapsulating said metallic core, and a silver containing outerlayer, characterized in that, said metallic core comprises or consists of elemental metal selected from the group consisting of aluminum, copper, iron, nickel, zinc, and alloys, oxides and mixtures thereof, said dielectric layer comprises at least an organic polymer or one metal oxide selected from the group consisting of silicone oxide, aluminum oxide, titanium oxide, zirconium oxide, tin oxide, and mixtures thereof, wherein said silver containing layer is a continuous and opaque layer, wherein a silver ion coordinating layer is arranged between said dielectric layer and said silver containing layer and optionally, a further outer surface modification layer in an amount of 0 to 3 wt. %, based on the total weight of the electrically conductive particles.

The electrical conductivity of metals varies. Among the metals, silver has the highest electrical conductivity. However, silver has the significant disadvantage to be cost intensive.

The inventors have found out that surprisingly a continuous and opaque silver containing layer, preferably a continuous and opaque layer consisting of silver, can be arranged on a composite particle comprising a metallic core and a dielectric layer encapsulating said metallic core, if a silver ion coordinating layer is arranged between said dielectric layer and said silver containing layer, preferably a layer consisting of silver.

The metallic core comprising or consisting of elemental metal is selected from the group consisting of aluminum, copper, iron, nickel, zinc, and alloys, and mixtures thereof. In a preferred embodiment the metallic core comprises or consists of aluminum or an alloy thereof. In a further preferred embodiment the metallic core can be easily produced by atomization, preferably by gas atomization, from the respective molten metal or molten alloy yielding metallic powder. During atomization, the molten metal can be contacted with high pressure jets of gas, preferably an inert gas, so that the molten metal is finally divided into droplets of molten metal. These finally divided metal droplets solidify and are subsequently collected as metal particles. The technology of producing metallic powder by atomization is well known in the art. The process of atomization can be optimized so that a powder of metallic particles having a desired particle size distribution is obtained. The metallic particles obtained can then be used as metallic cores for use in the present invention.

Thus, metallic particles or metallic cores, respectively, having a desired particle size distribution, for example, of a narrow or a broad particle size distribution, can be easily obtained from the indicated elemental metals, or alloys, or mixtures thereof. If desired, the particle size distribution of the metallic particles, i.e. of the obtained metallic cores, obtained by the atomization process, can be further classified. The classification can be effected by screening, air-classification, gas-classification, sedimentation, cyclone separation, etc.

In a further embodiment the metallic cores consists of flakes or a mixture of flakes and metallic powder. The flakes are produced by grinding metallic powder by methods well known in the art.

Flake-like metallic cores preferably have a $d_{50}$-value in a range of 10 to 60 μm and more preferably in a range of 12 to 50 μm and most preferably in a range of 20 to 40 μm.

Subsequently, the metallic particles or metallic cores, respectively, obtained preferably by gas atomization from the respective molted metal, are encapsulated with a dielectric layer comprising at least an organic polymer or one metal oxide selected from the group consisting of silicon oxide, aluminum oxide, titanium oxide, zirconium oxide, tin oxide, or mixtures thereof.

The encapsulation of metallic particles with metal oxides or polymers or mixtures thereof is known in the art.

For example, the dielectric layer can be preferably applied by a sol-gel-process to the metallic cores. In the sol-gel-process metal alkoxides are hydrolyzed in the presence of the metallic cores. The metal alkoxides hydrolyze in the presence of water, optionally at a slightly acidic or slightly alkaline pH. The metal alkoxides are hydrolyzed to the respective metal hydroxides which are then deposited on the metallic cores. The deposited metal hydroxides then dehydrate, by condensation of the hydroxyl groups, to the respective metal oxides and/or metal oxide hydrates, thus, encapsulating the respective metallic cores.

Of course, the respective metal hydroxides can also be produced by hydrolyzing of metal salts, preferably metal chlorides, in water. The metal hydroxides then condense to metal oxides and metal oxide hydrates as explained before with respect to the sol-gel-process.

The dielectric layer is a layer serving different purposes.

The dielectric layer encapsulates the metallic core and protects the metallic core against corrosive influences, such as, e.g., humidity or water. The dielectric layer also protects the environment against metallic ions which may be released from the metallic core into the environment. Thus, preferably, the dielectric layer is a barrier isolating the metallic core from the environment as well as the environment from the metallic core. These properties enable the electrically conductive particles of this invention to be preferably used in aqueous based formulations and/or to be applied in coatings which are exposed to corrosive environments like e.g. humidity.

Moreover, the dielectric layer electrically insulates the metallic core from the silver containing layer, preferably layer consisting of silver. As a consequence of the electric insulation of the metallic core from the silver containing layer, the electrical conductivity is only determined by the silver containing layer. If the silver containing layer is directly applied on the metallic cores of respective elemental metals or alloys thereof, the electrical conductivity would be supposed to be determined by the electrical conductivity of the metallic core as well as of the silver containing layer. It turned out surprisingly that the electrical conductivity of composite particles wherein the silver containing layer is separated from the metallic core by said dielectric layer is higher than the electrical conductivity of composite particles wherein the silver containing layer is directly applied on the metallic core.

The present invention offers the advantage to also use mixtures of various metallic cores, as recited in claim 1, in the electrically conductive particles of the present invention, wherein the electrical conductivity is only determined by the silver containing layer. Thus, the specific nature of the metallic core in the electrically conductive particles of the present invention does not have any influence on the electrical conductivity.

Furthermore, the dielectric layer allows reliably arranging a silver ion coordinating layer which is important to subsequently apply a continuous and opaque silver containing layer. Preferably, the silver ion coordinating layer comprises or consists of silver ion binding or complexing molecules which are preferably covalently bound to the dielectric layer.

The electrically conductive particles of the present invention are particularly suitable to be incorporated into different materials, such as, e.g., adhesives, sealants, polymeric materials, coatings, such as inks, paints, lacquers, etc.

In a preferred embodiment of the invention, the metal of the metallic core has a density comprised in the range of 1.50 $g/cm^3$ and 15.00 $g/cm^3$, preferably in the range of 2.00 $g/cm^3$ and 15.00 $g/cm^3$, more preferably in the range of 1.50 $g/cm^3$ and 10.00 $g/cm^3$, more preferably in the range of 2.00 $g/cm^3$ and 10.00 $g/cm^3$, most preferably in the range of 1.50 $g/cm^3$ and 8.00 $g/cm^3$, most preferably in the range of 2.00 $g/cm^3$ and 8.00 $g/cm^3$.

The elemental metals to be used according to the present invention have quite different densities. Aluminum has a density of 2.71 $g/cm^3$, copper of about 8.92 $g/cm^3$, iron of 7.86 $g/cm^3$, nickel of 8.91 $g/cm^3$, and zinc of 7.13 $g/cm^3$. Depending on the material into which the electrically conductive particles are to be incorporated, the density of the electrically conductive particles can be adjusted by choosing the respective elemental metal. Moreover, the density of the metallic core can be specifically adjusted by using alloys or mixtures of the indicated elemental metals. For example, the density of the electrically conductive particles can be adjusted in that the electrically conductive particles are not leafing and not settling in the material into which these particles are incorporated.

If, for example, a higher density of the electrically conductive particles is necessary in order to avoid a leafing of the electrically conductive particles to be incorporated into a specific material, such as, e.g., an adhesive, coating material, etc., the present invention allows to provide said electrically conductive particles using a metallic core having a higher density.

The electrically conductive particles of the present invention have a superior heat dissipating effect due to the metallic cores. Unlike hollow base particles or pure metal oxide particles, such as silicon oxide particles, the metallic cores have a superior heat dissipation or heat conduction due to the core comprising or consisting of aluminum, copper, iron, nickel, zinc, or alloys, or mixtures thereof. These metals all have superior heat conductive properties. In particular when using the electrically conductive particles of the present invention in electric or electronic appliances or electronics assembly, it is of utmost importance to dissipate any heat in order to prevent damages to electronic components.

Preferred embodiments of the electrically conductive particles are specified in depending claims 2 through 14.

The object of the invention is also solved by providing a composition comprising electrically conductive particles according to any one of claims 1 to 14.

The object of the invention is also solved by providing a method of manufacturing electrically conductive particles according to any one of claims 1 to 14, wherein said method comprises the following steps:
(i) providing metallic core particles,
(ii) applying a dielectric layer on said core particles,
(iii) applying a coordinating layer for silver ions on said dielectric layer,
(iv) contacting said coordinating layer of the coated particles with silver ions, provided by a silver compound dissolved in a solvent, to coordinate at least part of the silver ions on said coordinating layer,
(v) reducing said silver ions coordinated on the surface of said silver ion coordinating layer as well as further silver ions to provide a continuous and opaque silver containing layer on said coordinating layer,
(vi) optionally, applying an outer surface modification layer.

Finally, the object of the invention is solved by providing an article comprising electrically conductive particles according to any one of claims 1 to 14 or a composition according to claim 15.

The article of the invention is preferably selected from the group consisting of electronics assembly, displays, RFID-tags, sensors, EMI shielding (EMI: electromagnetic interference), RFI shielding (RFI: radio frequency interference), touch panels, smart packaging, membrane switches, heatable coatings, electroactive polymers, print electronics, conductive adhesive coatings, conductive dissipative coatings and gaskets.

The silver ion coordinating layer preferably comprises or consists of organic groups or organic molecules capable to bind or to complex silver ions.

According to another embodiment of the invention, the organic molecules are preferably bifunctional organic molecules. The first function of this organic molecule is to comprise a silver coordinating moiety, which may be a silver ion-binding moiety or a silver ion complexing moiety, in order to bind or complex the silver ions. The second function of this organic molecule is an adhesive group allowing an adhesion of the organic molecule on the surface of the dielectric layer. Preferably, the adhesive group allows forming a covalent bond to the dielectric layer.

Thus, the organic molecule preferably contains a silver coordinating moiety and an adhesive group spaced apart by a spacer group. The spacer group can be an alkylene chain having 2 to 24 carbon atoms, preferably 3 to 18 carbon atoms. This alkyl chain is preferably a linear n-alkyl. Moreover, this alkyl chain can also contain hetero atoms, such as O, S or NR, wherein R is H or lower alkyl with 1 to 6 carbon atoms, preferably 2 to 4 carbon atoms. Most preferably R is H, meaning that the alkyl chain can contain NH as hetero atom.

According to a preferred embodiment of the invention, the silver ion coordinating layer comprises a silver ion coordinating moiety and is preferably based on organofunctional silanes, titanates, aluminates or zirconates comprising a silver ion coordinating moiety.

According to a preferred embodiment of the invention the silver ion coordinating layer comprise a silver ion coordinating moiety or comprise a plurality of silver ion coordinating moieties.

According to a preferred embodiment the silver ion-coordinating layer is based on organofunctional silanes, organofunctional titanates, organofunctional aluminates or organofunctional zirconates, each comprising a silver ion-coordinating moiety.

Preferably, organofunctional silanes comprising a silver ion-coordinating moiety or moieties are used in combination with a dielectric layer comprising or consisting of silicon oxide, preferably $SiO_2$.

However, it turned out that the organofunctional silanes comprising a silver ion-coordinating moiety also bind covalently to a dielectric layer selected from the group consisting of aluminum oxide, titanium oxide, zirconium oxide, tin oxide, and mixtures thereof. The organic silanes comprising a silver ion-coordinating moiety can also be used in combination with organic polymers as a dielectric layer.

According to another preferred embodiment organofunctional titanates comprising a silver ion-coordinating moiety are used in combination with a dielectric layer comprising or consisting of titanium oxide, preferably $TiO_2$.

According to another preferred embodiment of the invention, the organofunctional aluminates comprising a silver ion-coordinating moiety are used in combination with a dielectric layer comprising or consisting of aluminum oxide, preferably, $Al_2O_3$.

According to another preferred embodiment of the invention the organofunctional zirconates comprising a silver ion-coordinating moiety are used in combination with a dielectric layer comprising or consisting of zirconium oxide, preferably $ZrO_2$.

It turned out that the silver ion-coordinating layer is reliably attached to the dielectric layer if the metal ion of the organofunctional compound matches with the metal ion of the metal oxide compound of the dielectric layer.

For example, the silanol group of the organofunctional silane easily reacts with the silanol groups on the surface of a silicon oxide containing dielectric layer. The same applies for the respective titanates, aluminates or zirconates, which easily react with hydroxyl groups on the surface of a titanium oxide layer, aluminum oxide layer, or zirconium oxide layer, respectively.

It turned out that organofunctional silanes also bind reliably to a dielectric layer comprising or consisting of organic polymers.

According to another preferred embodiment, the silver ion-coordinating layer comprises at least one silane of formula (I):

$$(R^1O)_{(4-a-b-c)}Si(R^2X)_a(R^3)_b(R^4)_c \quad (I),$$

wherein a is an integer selected from 1, 2, or 3, b and c are independently selected integers from 0, 1, or 2, with the proviso that a+b+c is an integer between 1 and 3, $R^1$ is alkyl with 1 to 4 carbon atoms, $R^2$ is selected independently from each other from branched-chain or straight chain alkylene with each 1 to 14 carbon atoms or a cycloalkylene from 5 to 11 carbon atoms, and $R^3$ or $R^4$ are selected independently from each other from branched-chain or straight chain alkyl with each 1 to 14 carbon atoms or a cycloalkyl from 5 to 11 carbon atoms or H and X is a silver ion coordinating moiety.

According to a preferred embodiment, $R^1$ is selected from the group consisting of methyl, ethyl or n-propyl. Preferably, $R^1$ is methyl or ethyl.

$R^2$, $R^3$, and $R^4$ are preferably selected independently from each other from branched-chain or straight-chain alkenyl with each 2 to 12 carbon atoms, preferably 3 to 10 carbon atoms, more preferably 3 to 8 carbon atoms. $R^2$, $R^3$, and $R^4$ can also be selected from cycloalkenyl comprising a cyclopentenyl or cyclohexenyl ring.

According to a very preferred embodiment a=1 and b=c=0.

According to another preferred embodiment the silane to be used is a pre-hydrolyzed silane.

According to another preferred embodiment, the silver ion-coordinating moiety X is independently selected from the group consisting of mercapto, thioalklyether, amino, thiocyanate, cyanate, cyanide, ureido, carbamate and mixtures thereof. In case of a mixture of different silver ion-coordinating moieties X this mixture can comprise or consist of a mixture of different silanes with different X. In case that a=2 or 3, X can be also denote to different moieties within one silane molecule.

The alkyl group of the thioalkylether is preferably lower alkyl with 1 to 6 carbon atoms, preferably 2 to 4 carbon atoms. The thioalkylether is preferably selected from the group consisting of thiomethyl, thioethyl and mixtures thereof.

Preferably, the silver ion coordinating moiety X of formula (I), is selected from the group consisting of mercapto, thioalkylether, preferably thiomethyl, thioethyl, amino, thiosulfate, carbamate, ureates, thiocyanate, cyanate, cyanide, bipyridyl and mixtures thereof.

According to another preferred embodiment, the silver ion coordinating layer comprises at least one silane selected from the group consisting of mercaptosilane, amino silane, thiocyanate silane, and mixtures thereof and according to another very preferred embodiment, the silver ion coordinating layer comprises at least one silane selected from the group consisting of mercaptosilane, amino silane and mixtures thereof.

According to a particular preferred embodiment the silver ion coordinating layer comprises or consists of mercaptosilane having preferably the structure as depicted in formula (I) wherein X is mercapto (—SH).

As silver ions have a particular affinity to sulfur containing groups, mercaptosilane(s), thioalklylether containing silane(s), or thiocyanate containing silane(s) is/are particularly preferred.

The silver ion coordinating organic compounds used for the application of the silver coordinating layer are preferably selected from the group consisting of 3-mercaptopropyl trimethoxysilane, mercaptopropyl methyl dimethoxysilane, 3-mercaptopropyl triethoxysilane, 3-thiocyanatopropyl triethoxysilane and mixtures thereof.

Most preferably, 3-mercaptopropyl trimethoxysilane is used as silver ion coordinating compound for the silver ion-coordinating layer.

If the silver ion-coordinating compound is an amino silane it is preferably selected from the following examples: (6-amino-n-hexyl)(triethoxy)silane, (6-amino-n-hexyl)(trimethoxy)silane, (4-amino-3,3-dimethylbutyl)(trimethoxy)silane, $(H_2N(CH_2)_3)Si(OCH_3)_3$ ((3-aminopropyl)(trimethoxy)silane, AMMO), $(H_2N(CH_2)_3)Si(OC_2H_5)_3$ ((3-aminopropyl)(triethoxy)silane, AMEO), (3-aminoisobutyl)(trimethoxy)silane, (3-aminoisobutyl)(triethoxy)silane, (2-aminoethyl)(trimethoxy)silane, (2-aminoethyl)(triethoxy)silane, (aminomethyl)(trimethoxy)silane, (aminomethyl)(triethoxy)silane, (N-cyclohexylaminomethyl)(triethoxy)silane (GENIOSIL XL 926), (N-phenylaminomethyl)(trimethoxy)silane, (6-amino-n-hexyl)(methyl)(dimethoxy)silane, (3-aminopropyl)(methyl)(dimethoxy)silane, (3-aminopropyl)(methyl)(diethoxy)silane, (2-aminoethyl)(phenyl)(dimethoxy)silane, (2-aminoethylamino)(ethyl)(triethoxy)silane (2-aminoethyl)(methyl)(diethoxy)silane, (2-aminoethyl)(methyl)(dimethoxy)silane, (1-aminomethyl)(methyl)(diethoxy)silane, (N-cyclohexylaminomethyl)(methyl)(diethoxy)silane (GENIOSIL XL 924), (N-ethylamino-1-butyl)(trimethoxy)silane, (N-n-butyl-3-aminopropyl)(trimethoxy)silane, (N-n-butyl-3-aminopropyl)(triethoxy)silane, (N-n-butyl-1-aminomethyl)(triethoxy)silane, (N-n-butyl-1-aminomethyl)(trimethoxy) silane, (benzyl-3-aminopropyl)(trimethoxy)silane, (benzyl-3-aminopropyl)(triethoxy)silane, (N-phenylaminomethyl)(trimethoxy)silane (GENIOSIL XL 973), (N-phenylaminopropyl)-(trimethoxy)silane (N-formyl-3-aminopropyl)(triethoxy)silane, (N-formyl-3-aminopropyl)(trimethoxy)silane, (N-formyl-1-aminomethyl)(methyl)(dimethoxy)silane, (N-formyl-1-aminomethyl)(methyl)(diethoxy)silane, (N-n-butyl-3-aminopropyl)(methyl)(diethoxy)silane, (N-n-butyl-3-aminopropyl)(methyl)(dimethoxy)silane, (N-n-butyl-1-aminomethyl)(methyl)-(dimethoxy)silane, (N-butyl-1-aminomethyl)(methyl)(diethoxy)silane, (diaminoethylen-3-propyl)(triethoxy) silane, (N-(2-aminoethyl)aminoethyl)(trimethoxy)silane, (2-aminoethylaminoethyl)(triethoxy)silane, (N-(1-aminoethyl)aminomethyl)(trimethoxy)silane, (N-(1-aminoethyl)aminomethyl)(triethoxy)silane, $(H_2N(CH_2)_2NH(CH_2)_3)Si(OCH_3)_3$ ((N-(2-aminoethyl)-3-aminopropyl)(trimethoxy)silane, (DAMO)), (2-aminoethylaminopropyl)(triethoxy)silane (Silquest A-1130), (2-aminoethylaminoethyl)(trimethoxy)silane, (2-aminoethylaminoethyl)(triethoxy)silane, (1-aminoethylaminopropyl)(trimethoxy)silane, (1-aminoethylaminopropyl)(triethoxy)silane, (1-aminoethylaminomethyl)(trimethoxy)silane, (1-aminoethylaminomethyl)(triethoxy)silane, (N-cyclohexyl-3-aminopropyl)(trimethoxy)silane, (N—(N-benzylaminoethyl)aminopropyl)(trimethoxy)silane, (3-ureidopropyl)(trimethoxy)silane, (3-ureidopropyl)(triethoxy)silane, (N-(2-aminoethyl)-3-aminopropyl)(methyl)(dimethoxy)silane, (N-(2-aminoethyl)-3-aminopropyl)(methyl)(diethoxy)silane, $H_2N(CH_2)_2NH(CH_2)_2NH(CH_2)_3Si(OCH_3)_3$ ((triaminodiethylen-3-propyl)(trimethoxy)silane, TRIAMO), (triaminodiethylen-3-propyl)(triethoxy)silane, (triaminodiethylen-3-propyl)(trimethoxy)silane, (triaminodiethylen-3-propyl)(triethoxy)silane, (((aminoethyl)aminoethyl)aminopropyl)(trimethoxy)silane, (((aminoethyl)aminoethyl)aminopropyl)(triethoxy)silane, aminopropylsilanetriol, (3-Trimethoxy)silylmethyl-O-methylcarbamat, N-Dimethoxy-(methyl)silylmethyl-O-methylcarbamat, Triethoxysilylpropyl)-t-butylcarbamate, Triethoxysilyl-propylethylcarbamate, Tris-AMEO) Tris(triethoxysilylmethyl)amine, (Tris-AMMO), (Bis(triethoxysilylpropyl)amine, Bis-AMEO), (Bis(trimethoxysilylpropyl)amine. Bis-AMMO), $(H_3CO)_3Si(CH_2)_3NH(CH_2)_2NH(CH_2)_3Si(OCH_3)_3$ (Bis-DAMO), $(H_3CO)_3Si(CH_2)_3NH(CH_2)_2NH(CH_2)_2NH(CH_2)_3Si(OCH_3)_3$ (Bis-TRIAMO), $(H_3CO)_2(CH_3)Si(CH_2)_3NH(CH_2)_2NH(CH_2)_3Si(OCH_3)_2(CH_3)$, $(H_3CO)_3(CH_3)Si(CH_2)SiNH(CH_2)_2NH(CH_2)_2NH(CH_2)_3Si(OCH_3)_2(CH_3)$, $(H_3CO)_3Si(CH_2)_3NH(CH_2)_2NH(CH_2)_2NH(CH_2)_3Si(OCH_3)_3$ (Bis-DAMO), $(H_3CO)_3Si(CH_2)_3NH(CH_2)_2NH(CH_2)_2NH(CH_2)_2NH(CH_2)_3Si(OCH_3)_3$ (Bis-TRIAMO) and mixtures thereof.

More preferably the aminosilane is selected from 3-aminopropyltriethoxysilane, 3-aminopropyltrimethoxysilane, 4-aminobutyltriethoxysilane, aminopropylsilanetriol, 3-aminopropylmethyldiethoxysilane, aminopropyldimethylethoxysilane, n-butylaminopropyltrimethoxysilane, 2-aminoethyl-3-amino-propylmethyldi-methoxysilane or 2-aminoethyl-3-amino-propyltri-methoxysilane.

Most preferred is 3-aminopropyltriethoxysilane or 3-aminopropyltrimethoxysilane.

According to another embodiment of the invention the dielectric layer is present in an amount in a range of 0.5 to 15 wt.-%, based on the total weight of the metallic core. According to preferred embodiments, the dielectric layer is present in an amount of 0.6 to 10 wt.-%, more preferably in a range of 0.7 to 5 wt.-%, and even more in a range of 1 to 3 wt.-%, each based on the total weight of the metallic core.

Surprisingly, the dielectric layer can be present only in minor amount in order to serve the above described purposes to protect the metallic core against corrosive influences and also to protect the environment from the release of metallic ions from the metallic core.

According to another preferred embodiment the dielectric layer is a layer comprising or consisting of a hybrid mixture of metal oxide, preferably silicon oxide, and at least one organic component, selected from the group consisting of organic oligomers, organic polymers, and mixtures thereof. Such hybrid layers are described in EP 1812519 B1, which is incorporated herein.

By organic oligomers in the hybrid phase are meant, in this invention, the concept which is customary in polymer chemistry: that is, the linking of two to twenty monomer units (Hans-Georg Elias, "Makromoleküle", 4$^{th}$ Edition 1981, Hüthig & Wepf Verlag, Basle). Polymers are linkages of more than twenty monomer units.

In view of the diversity of organic monomers and the use of above-mentioned metal oxides or metal oxide mixtures, there is in principle a wide range of variation possibilities for the formation of a hybrid inorganic/organic layer. The average chain length of the organic segments is 2 to 10 000, preferably 4 to 5000, more preferably 10 to 1000, and very preferably 40 to 200 monomer units.

As organic component it is particularly preferred, furthermore, to use organic polymers having average chain lengths of 21 to 15 000, preferably of 50 to 5000, and more preferably of 100 to 1000 monomer units.

The organic oligomer(s) and/or organic polymer(s) in the hybrid layer is/are constructed by scaffold molecules which are customary in organic polymer chemistry. These are, for example, C—C bonds, amines, esters, acrylates, etc.

The organic oligomer(s) and/or organic polymer(s) in the hybrid layer may preferably be constructed by polymerization of suitable monomers. The monomers may have functionalities selected from the group consisting of amino, hydroxyl, thiol, epoxy, acrylate, methacrylate, vinyl, allyl, alkenyl, alkynyl, carboxyl, carboxylic anhydride, isocyanate, cyanate, ureido, carbamate, and ester group, and mixtures thereof. The organic oligomer(s) and/or organic polymer(s) preferably bind(s) covalently to the respective metal oxide(s). It is, however, also possible that the organic oligomer(s) and/or organic polymer(s) do(es) not form covalent bonds with the metal oxide(s).

In a further embodiment of the invention the organic oligomer(s) and/organic polymer(s) is/are not prepared during the formation of the hybrid layer. Instead, the organic component(s) used comprise(s) reactive organic oligomer(s) and/or polymer(s) which possess reactive group(s) which permit attachment to the metal oxide.

Examples of reactive organic oligomer(s) and/or organic polymer(s) which can be incorporated directly into the inorganic network that forms, during the reaction, include the following: silane-modified polyethyleneimine(s) or polybutadiene(s), or aminosilane-modified polyethylene oxide urethane(s). For these compounds, particularly low molecular weights of 100 to 1.000 g/mol are preferred. Low molecular weight compounds of this type have a particularly large number of linkage sites to the inorganic metal oxide network, and so produce more homogeneously distributed mixed inorganic/organic layer.

Examples of commercially available compounds of this kind are:
trimethoxysilylpropyl-substituted polyethyleneimine, dimethoxymethylsilylpropyl-substituted polyethyleneimine, triethoxysilyl-modified polybutadienes, dimethoxymethylsilyl-modified polybutadienes, (N-triethoxysilylpropyl)-O-polyethylene oxide urethane, and poly(trimethylsilylpropyne) (all available from, for example, ABCR GmbH & Co. Postfach 210135, Hansastr. 29c, D-76151 Karlsruhe, Germany). A further example are silane-modified phenol-formaldehyde oligomers, of the kind produced and sold as resoles or novolakes by Bakelite AG (Gennaer Straße2-4, D-58642 Iserlohn-Letmathe).

In a further embodiment of the invention it is also possible as reactive oligomer(s) and/or polymer(s) to use compounds which possess reactive, preferably polymerizable, functional groups. The polymerizable functional groups can be prepared, for example, by a subsequent reaction of the oligomer(s) and/or polymer(s) as for example by means of a polymer-analogous reaction.

These reactive oligomer(s) and/or polymer(s) may be reactive polymer(s) selected from the group consisting of polyacrylates, polymethacrylates, polyethers, polyesters, polyamines, polyamides, polyols, polyurethanes, polyolefins and mixtures thereof.

According to a preferred embodiment the dielectric layer is a silicon oxide layer. More preferably, the silicon oxide is or consists of silicon dioxide.

According to a preferred embodiment of the invention the silicon oxide, preferably $SiO_2$, is present in an amount in a range of 0.5 to 15 wt.-%, preferably in an amount of 0.6 to 10 wt.-%, preferably in a range of 0.7 to 5 wt.-%, more preferably in a range of 1 to 3 wt.-%, based on the total weight of the metallic core.

According to another embodiment of the invention the dielectric layer consists of silicon dioxide and a second dielectric layer consisting of a polymer, wherein said second dielectric layer is located either directly on the silicon dioxide layer or between the silver ion coordinating layer and the silicon dioxide layer.

According to another embodiment of the invention, the dielectric layer can have a multilayer structure comprising two, three or four sublayers. Preferably, the dielectric layer consists of two sublayers being preferably of different nature. According to another embodiment of the invention the dielectric layer is formed of a metal oxide sublayer selected from the group consisting of silicon oxide, aluminum oxide, titanium oxide, zirconium oxide, tin oxide or mixtures thereof, and a sublayer comprising or consisting of an organic polymer sublayer. The organic polymer sublayer is arranged preferably in direct contact with the aforementioned metal oxide sublayer, either above or below said metal oxide sublayer.

According to another embodiment of the invention the dielectric layer consists of a silicon oxide sublayer, preferably $SiO_2$ sublayer, and a dielectric organic polymer sublayer, wherein said organic polymer sublayer is located directly in contact with said silicon oxide layer, preferably $SiO_2$ sublayer. According to an embodiment of the invention, the organic polymer sublayer is arranged between the metallic core and the silicon oxide layer, preferably $SiO_2$ sublayer. According to another embodiment of the invention, the organic polymer sublayer is arranged between the silicon oxide layer, preferably $SiO_2$ sublayer, and the silver ion coordinating layer.

That is to say, the dielectric organic polymer sublayer can be in arranged below or above the silicon oxide layer, preferably $SiO_2$ sublayer, however, preferably in directly contact with the silicon oxide layer, preferably $SiO_2$ sublayer.

The polymer sublayer can be a polymer selected from the group consisting of polyacrylate, polymethacrylate, polyethers, polyesters, polyamines, polyamides, polyols, polyurethanes, polyolefins and mixtures thereof.

Polyacrylate and/or polymethacrylate are particularly preferred organic polymers to be used in the invention.

According to another embodiment of the invention, the dielectric layer is an organic polymer, preferably a pure organic polymer. The organic polymer is preferably selected from the group consisting of polyacrylates, polymethacrylates, polyethers, polyesters, polyamines, polyamides, polyols, polyurethanes, polyolefins, and mixtures thereof.

According to an embodiment of the invention, the dielectric layer is a polyacrylate and/or polymethacrylate, preferably a pure polyacrylate and/or polymethacrylate.

According to another embodiment of the invention the silver containing layer, preferably layer consisting of silver, is present in an amount of 5 to 45 wt.-%, preferably between 10 to 40 wt.-%, more preferably between 15 to 35 wt.-%, more preferably between 20 to 30 wt.-%, based on the total weight of the electrically conductive particles.

According to another embodiment of the invention, the silver containing layer, preferably layer consisting of silver, is present in an amount of 20 to 40 wt.-%, more preferably between 30 to 35 wt.-%.-%, based on the total weight of the electrically conductive particles.

According to another embodiment, the silver containing layer, preferably layer consisting of silver, is present in an amount of 10 to 30 wt.-%, preferably between 15 to 20 wt.-%, based on the total weight of the electrically conductive particles.

According to another embodiment of the invention, the thickness of the silver containing layer, preferably of the layer consisting of silver, is in a range between 50 nm and 600 nm, further preferably between 80 nm and 500 nm, further preferably between 100 nm and 420 nm.

According to an aspect of the invention the ratio of the weight of the silver containing layer, preferably layer consisting of silver, to the total weight of the electrically conductive particles is preferably higher when the particle size of the metallic core is smaller. If the particle size of the metallic core is larger, the ratio of the weight of the silver containing layer, preferably layer consisting of silver, to the total weight of the electrically conductive particles is preferably smaller.

For example, if the median particle size of the metallic core has a $d_{50}=5$ μm, the weight of the silver containing layer, preferably layer consisting of silver, is preferably in a range of 20 to 40 wt.-%, more preferably in a range of 30 to 40 wt.-%, based on the total weight of the electrically conductive particles.

For example, if the median particle size on the metallic core has a $d_{50}=20$ μm, the weight of the silver containing layer, preferably layer consisting of silver, is preferably in a range of 10 to 30 wt.-%, more preferably in a range of 15 to 25 wt.-%, each based on the total weight of the electrically conductive particles.

For example, if the median particle size of the metallic core has a $d_{50}=45$ μm, the weight of the silver containing layer, preferably layer consisting of silver, is preferably in a range of 5 to 30 wt.-%, more preferably in a range of 7 to 15 wt.-%, each based on the total weight of the electrically conductive particles.

According to another embodiment of the invention the silver containing layer has a smooth surface.

According to another embodiment of the invention, the silver containing layer comprises at least 60 wt.-%, preferably at least 90 wt.-%, further preferably at least 98 wt.-%, elemental silver, based on the total weight of said silver containing layer. According to a preferred embodiment, the silver containing layer consists of elemental silver.

According to an embodiment of the invention the electrically conductive particles have an electrical powder resistivity in a range of 0.2 to below 100 mΩ*cm. Preferably, the electrically conductive particles have an electrical powder resistivity in a range of 0.3 to below 50 mΩcm, further preferably in a range of 0.4 to below 20 mΩcm, further preferably in a range of 0.45 to below 10 mΩcm, further preferably in a range of 0.5 to 5 mΩcm, further preferably in a range of 0.55 to 1.5 mΩcm, further preferably in a range of 0.6 to 1 mΩcm.

The electrical powder resistivity is measured using Milliohmmeter Resistomat® 2316 (Burster Präzisionsmesstechnik GmbH & Co. KG, 76593 Gernsbach, Germany) according to the instructions in the experimental part.

According to another embodiment of the invention the metallic cores have a median diameter $d_{50}$ in the range of 2 µm to 100 µm, further preferably in a range of 3 µm to 85 µm, further preferably in a range 4 µm to 75 µm, most preferably in a range 4 µm to 40 µm and very most preferably in a range 4 µm to 30 µm.

The median $d_{50}$ value indicates the diameter of a volume based cumulative particle size distribution of the metallic cores wherein 50% of the particles have a diameter equal or below that value. The other 50% of the particles have a diameter larger than the indicated value.

The particle size distribution is measured by laser diffraction using Helos/BF (Sympatec GmbH System-Partikel-Technik, 38678 Clausthal-Zellerfeld, Germany) according to the instructions of the manufacturer.

The $d_{50}$ value of the metallic cores is selected depending on the intended application.

For example, metallic cores having a median diameter $d_{50}$ in the range of 2 to 10 µm, preferably of 3 to 8 µm, are used for conductive inks and paints for printed electronics and conductive adhesives applications.

For example, metallic cores having a median diameter $d_{50}$ in the range of 20 to 75 µm are used for conductive adhesives and sealants, electroactive polymers and EMI/RFI shielding.

According to another embodiment of the invention, the metallic cores have a spherical form, plate-like form, or a dendritic form. According to an aspect of the invention, the metallic cores can also be a mixture of spherical metallic cores, plate-like metallic cores, and dendritic metallic cores. According to a preferred embodiment of the invention the metallic cores have a substantially spherical form, preferably a spherical form.

According to an aspect of the invention the metallic cores have a narrow particle size distribution as defined by the span ΔD:

$$\Delta D = (d_{90} - d_{10})/d_{50}.$$

A $d_{90}$ value means that 90% of the metallic cores have a particle size of less than the indicated value of a cumulative distribution on a volume base, as measured by laser diffraction. A $d_{50}$ value means that 50% of the metallic cores have a particle size of less than the indicated value of a cumulative distribution on a volume base, as measured by laser diffraction. A $d_{10}$ value means that 10% of the metallic cores have a particle size of less than the indicated value of a cumulative distribution on a volume base, as measured by laser diffraction.

The span ΔD is preferably in a range between 0.5 and smaller than 5, further preferably in a range between 0.7 and smaller than 4, further preferably in a range between 0.8 and smaller than 3, further preferably in a range between 0.9 and smaller than 2.5.

If the metallic cores is in particular powder (shot) the span ΔD is preferably in a range between 1.9 to 2.2 for a powder with a $d_{50}$ of 5 to 10 µm. For a powder with a $d_{50}$ in a range of over 10 to 20 µm the span is preferably in a range of 1.2 to 4.6 and more preferably in range of 1.5 to 1.7.

A smaller span ensures a better conductivity as more particle-particle interactions can occur in a hardened coating containing the conductive particles.

Powders with a $d_{50}$ in a range of over 10 to 20 µm are preferably used in adhesives.

Powders with a $d_{50}$ in a range of 5 to 10 µm are preferably used in screen printing applications.

If the metallic cores are in particular platelet-like (flakes) the preferred span ΔD is in a range of 1.0 to 1.4, in particular 1.1 to 1.35 for a flake with a $d_{50}$ in a range of 20 to 40 µm.

Such flakes are preferably used in Conductive Coatings or EMI-shielding.

If the metallic platelet-like cores have a $d_{50}$ in a range of 10 to below 20 µm the span ΔD is preferably in a range of 0.9 to 2.1 and more preferably in a range of 1.3 to 2.0.

It turned out that the electrical conductivity of the electrically conductive particles increases if the span decreases.

Although not wishing to be bound by theory, the inventors believe that the packing of the electrically conductive particles within a carrier material, such as a paint, lacquer, adhesive, sealant, etc., improves the smaller the particle size distribution of the electrically conductive particles is, i.e. the smaller the span ΔD is. A dense packing of the electrically conducive particles of the invention improves the electrically conductivity and, thus, is advantageous. In view of that, it is preferred according to an embodiment of the invention that the electrically conductive particles have substantially a spherical form.

Moreover, the inventors believe that the thickness of the silver containing layer, preferably of the layer consisting of silver, is the more homogenous between the particles the narrower the span ΔD of the metallic cores is. It turned out that the silver containing layer, preferably the layer consisting of silver, is deposited more uniformly in terms of thickness.

According to another embodiment of the invention the metallic cores are a plate-like metallic cores having a median diameter $d_{50}$ and an average thickness $h_{50}$, wherein the aspect ratio of the median diameter $d_{50}$ to the average thickness $h_{50}$ is in a range of 5:1 to 1000:1, preferably in a range of 20:1 to 500:1.

The median diameter $d_{50}$ of the metallic core is also measured using laser diffraction as mentioned above.

The average thickness of plate-like metallic cores can be determined with the aid of a scanning electron microscope (SEM). Here, a sufficient number of particles should be measured to provide a representative average value. Customarily, approximately 100 particles are measured.

A resin customarily used in electron microscopy, for example TEMPFIX (Gerhard Neubauer Chemikalien, D-48031 Munster, Germany), is applied to a sample plate and heated to softening on a hotplate. Subsequently, the sample plate is taken from the hotplate and the respective plate-like metallic cores are scattered onto the softened resin. The resin becomes solid again as a result of cooling and the scattered aluminum pigments—due to the interplay between adhesion and the force of gravity—can be prepared standing almost vertically and fixed to the sample plate. As a result, the plate-like metallic cores can readily be measured laterally in the electron microscope. In the measurement of the thickness, the azimuthal angle alpha α of the plate-like metallic core is estimated relative to a plane normal to the surface and allowed for when evaluating the thickness according to the formula $$h_{eff} = h_{mes}/\cos \alpha.$$

Plate-like metallic cores are preferred if the electrically conductive particles are to be arranged in a plane, for example, as conducting paths on an area. For example, if the electrically conductive particles are used in the manufacture of a printed circuit wherein the conducting passes are arranged on a flat area, the plate-like structure is advantageous. On an area the plate-like particles can arrange above and below each other thus forming the conducting path.

If an electrical contact is to be arranged not only in a two dimensional manner but in a three dimensional manner, spherical electrically conductive particles are preferred. For example, if an electrical contact is to be effected between two printed circuits, spherical electrically conductive particles are to be incorporated into the respective carrier medium, for example an adhesive. In this case the spherical electrically conductive particles are piled up on each other such creating a three dimensional electrical contact.

Spherical electrically conductive particles are preferably used in surface mount adhesives.

Spherical electrically conductive particles can also be used for the manufacture of electronic products including thick film features that are active in the function of the product when used. For example, the electrically conductive particles may be used to make capacitor electrodes for chip capacitor designs, including supercapacitors, and especially for multi-layer capacitors. The electrically conductive particles can also be used to a thick film grid for collecting and distributing electrical current. For example the electrically conductive particles may be used to make the lines for resistive heating, for example on windows for deicing and/or defogging. Also, the electrically conductive particles may be used to make a grid electrode for a photovoltaic module.

Another important application for the electrically conductive particles is to make films or sealants for electromagnetic shielding to prevent interference of electromagnetic waves with the operation of electronic components, such as cellular telephones and computers.

According to a preferred embodiment of the invention the metallic cores are essentially spherical metallic cores.

The roundness factor (circularity) is preferably measured with the Flow Particle Image Analyzer FPIA-3000 of Sysmex Corporation, Kobe, Japan. The FPIA-3000 is operated according to the instructions of the manufacturer, wherein the calculation of the roundness factor is weighted by number, i.e. the calculation is done on a number base.

According to a preferred embodiment, the roundness factor is in a range of 0.85 to 1, further preferred in a range of 0.88 to 0.98, further preferred in a range of 0.90 to 0.97. A roundness factor Rf of 1 means that the metallic core is a perfect sphere.

Although it is preferred to have metallic cores which come as close as possible to a perfect sphere, it is not necessary that the metallic core has a form of a perfect sphere.

As explained above, it is advantageous when producing a three dimensional conducting path to use spherical electrically conductive particles. For this purpose it is sufficient if the roundness factor is in the indicated ranges. Within the indicated ranges the electrically conductive particles have sufficient three dimensional contacts to create a sufficient three dimensional conducting path.

The invention is also directed to a composition which comprises electrically conductive particles according to any one of claims 1 to 14.

The filler loading of the electrically conductive particles in adhesive and sealant applications in the composition is preferably in a range of 50 to 95 wt.-%, preferably in a range of 60 to 90 wt.-%, further preferably in a range of 65 to 85 wt. %, further preferably in a range of 70 to 80 wt.-%, based on the total weight of the composition.

The filler loading of the electrically conductive particles in conductive coating applications in the composition is preferably in a range of 15 to 30 wt.-%, preferably in a range of 18 to 25 wt.-%.

Preferably, the composition is selected from group consisting of pastes, coatings, films, foils, adhesives, fillers, plastics, elastomers, sealants, rubbers, and mixtures thereof.

Preferably, the coatings are selected from the group consisting of inks, paints, lacquers, and mixtures thereof.

According to a preferred embodiment of the invention the compositions comprising electrically conductive particles are paste-like or pastes.

The adhesives are preferably surface mount adhesives.

Electrically conductive adhesives are preferably used in combination with electronic parts, for example to adhere electronic components and electronic assembly parts on printed circuits.

For example, the electrically conductive adhesives can be electrically conductive epoxy adhesives which are used in thermal and electrical interconnect and structural bonding for improved variability in electronic systems. Advantageously, electrically conductive epoxy adhesives cure at room temperature.

The electrically conductive particles can also be used in electrically conductive films, preferably electrically conductive adhesive films. These electrically conductive adhesive films can be used in automotive electronics, consumer and industrial electronics, defense and air space electronics, handheld communications and computing, solar technology, LED lightning, medical electronics, as well as RFID technologies such as RFID labels.

The electrically conductive inks, paints or lacquers can be used in the manufacture of flexible circuits for membrane touch switches, keyboards for desktop and notebook PCs, heating elements, automotive sensors, biosensors, for example for glucose test strips, EKG-ECG electrodes, TENS pads (TENS: transcutaneous electrical nerve stimulation), in particular for muscle stimulation, iontophoresis pads, in particular for drug delivery, antennas for contactless smart cards, and RFID labels, touch screens, lighting, printed circuit boards, potentiometers, as well as household appliances.

The RFID labels and technology can be used in smart cards, passports, credit cards, transportation payment systems, etc.

The electrically conductive inks, such as electrically conductive printing inks, electrically conductive paints and electrically conductive lacquers allow a fine line printing wherein at the same time reliable conductive paths can be created.

Electrically conductive inks can be used generally for the production of printed electronics. Electrically conductive inks can also be used for membrane touch switches, automotive touch screens, backlight switches, keyless entry devices, luminescent displays, printed LED-lighting, shielding, solar cells and high amperage designs.

Furthermore, the electrically conductive particles of this invention are a cost efficient alternative for pure silver particles used in applications with high electrical conductivity.

The RFID technology is used in smart cards, passports, credit cards, transportation payment systems, etc. The electrically conductive inks of the present invention can be used to produce RFID products by printing.

An adhesive containing the electrically conductive particles of the present invention allows providing surface mount adhesives. The surface mount adhesives are particularly used in high-speed assembly processes in the production of electronics assembly.

According to a preferred embodiment the electrically conductive particles of the present invention are used in conductive pastes and conductive coatings.

Particularly the electrically conductive particles of the present invention are used in electronics assembly, displays, RFID-tags, sensors, EMI shielding, touch panels, smart packagings, membrane switches, heatable coatings, electroactive polymers, printed electronics, conductive adhesive coatings, conductive dissipative coatings and gaskets.

Electrical conductive formulations containing electrically conductive particles according to any one of claims 1 to 14.

Electrically conductive particles of the present invention in pastes, coatings, films, foils, adhesives, fillers, plastics, elastomers, sealants, rubbers, and mixtures thereof allow both providing a superior electrical conductivity as well as a superior thermal conductivity, in particular at low costs. Due to the use of metallic cores the electrically conductive particles provide a superior heat dissipation and heat release. This is a particular advantage in electronic assemblies as the electronic components are usually heat sensitive. Therefore, in case the electronics assembly is exposed to heat, which may be produced by interior processes of the electronics assembly, the heat is dissipated and released from the electronics assembly. Thus, the electrically conductive particles of the present invention provide a significant advantage by using a metallic core.

The electrically conductive particles of the present invention are produced by a method of manufacturing wherein said method comprises the following steps:
(i) providing metallic core particles,
(ii) applying a dielectric layer on said core particles,
(iii) applying a coordinating layer for silver ions on said dielectric layer,
(iv) contacting said coordinating layer of the particles obtained in step (iii) with silver ions, provided by a silver compound dissolved in a solvent, to coordinate at least part of the silver ions on said coordinating layer,
(v) reducing said silver ions coordinated on the surface of said silver ion coordinating layer as well as further silver ions to provide a continuous and opaque silver containing layer on said coordinating layer
(vi) optionally, applying an outer surface modification layer.

The metallic core particles can be produced by atomization of molten metal with gas, preferably inert gas. The particle size distribution of the obtained metallic particles can be controlled by the atomization process. For example, the pressure of the preferably inert gas and the type of the gas jets can have an influence on the particle size and particle size distribution of the obtained metallic particles, i.e. the metallic cores. Optionally, the obtained metallic particles can be classified by gas classification, air separation, sedimentation, by cyclone technology, by screening, etc.

The dielectric layer can be applied wet chemically to the metallic core particles. For example, the dielectric layer can be applied using a sol-gel-process or by hydrolyzing respective metal salts in water. It is also possible to apply the dielectric layer using chemical vapor deposition (CVD) or physical vapor deposition (PVD).

The dielectric layer is preferably applied by a sol-gel-process and can be subsequently dried at a temperature in a range of 20 to 200° C., further preferred at a temperature in a range of 25 to 100° C. Alternatively the coated metallic core coated with a dielectric layer can be used as filtercake or paste without a drying step. According to another preferred embodiment the dielectric layer is not calcined after application.

If the dielectric layer is not calcined, i.e. completely dewatered, then the dielectric layer still contains a plurality of hydroxide groups at the surface of the dielectric layer which allows a covalent binding of the silver ions coordinating layer, preferably of the silver ion coordinating organic molecule(s).

For applying the silver ion coordinating layer on the dielectric layer, the silver ion coordinating agent, for example an organofunctional silane comprising a silver ion coordinating moiety, an organofunctional titanate comprising a silver ion coordinating moiety, an organofunctional aluminate comprising a silver ion coordinating moiety or an organofunctional zirconate comprising a silver ion coordinating moiety, is added to the dispersion essentially after the step of forming the dielectric layer. Preferably, an organofunctional silane comprising a silver ion coordinating moiety is used.

If the dielectric layer is formed by a sol-gel process the silver ion coordinating layer is preferably formed by adding the e.g. respective organofuntional silane to the dispersion at the end of the reaction of the sol-gel process forming the dielectrical layer in a one pot synthesis.

In another embodiment the silica coated metallic particle can be separated from the reaction mixture of the sol-gel process before forming of the coordinating layer.

The silver ion coordinating agent then binds, preferably covalently, to the surface of the dielectric layer.

Following this, the thus coated particles are then brought into contact with a silver ion generating agent, for example a soluble silver salt, such as, e.g., silver nitrate.

The silver ion generating agent is added to the particle dispersion, preferably a particle dispersion in an organic solvent. The silver ions released from the silver ion generating agent, for example by hydrolysis, are then trapped by the silver ion coordinating agent on the surface of the dielectric layer. Subsequently, a reducing agent is added reducing the coordinated silver ions on the dielectric layer to elemental silver. Any appropriate reducing agent can be used, for example, glucose. The silver ions are preferably reduced to nanometric silver particles, which then act as initial nucleus or crystal nucleus leading to a deposition of further silver and silver ions which are reduced and provide a homogeneous and opaque silver layer on the dielectric layer.

The thickness of the silver layer can be controlled by the duration of the deposition time of elemental silver on the dielectric layer.

Optionally, an outer surface modification layer of surface modifiers can be applied. These surface modifiers are already known from DE 198 20 112 for example. With the help of such surface modifiers, the electrically conductive particles can be made compatible, in terms of their application properties, with the respective application medium used, which may be a coating material, a printing ink, an adhesive, or a sealant, for example.

The present invention is more particularly described in the examples and figures that follow, which are intended to be illustrative only, since numerous modifications and variations therein will be apparent to those skilled in the art.

FIGURES

FIG. 1 shows schematic drawings of electrically conductive particles. The drawings (a) to (c) show electrically conductive particles according to the prior art. The electrically conductive particle (d) illustrates the present invention.

The electrically conductive particle (a) has a structure wherein the silver layer is directly applied on a spherical substrate (comparative example 1).

The electrically conductive particle (b) has a structure wherein a silver ion coordinating layer is arranged between the spherical substrate and the silver layer (comparative example 2).

The electrically conductive particle (c) has a structure wherein a dielectric layer is directly applied on the spherical substrate and a silver layer is directly applied on a dielectric layer (comparative example 3).

The electrically conductive particle (d) of the invention has a structure, wherein a dielectric layer is applied on a spherical metallic core, a silver ion coordinating layer is applied on said dielectric layer, and finally a silver containing layer is applied on said silver ion coordinating layer (inventive example).

FIG. 2 shows SEM images of the electrically conductive particles shown schematically in FIG. 1. The images A, B, C, D correspond to the embodiments illustrated by the schematic drawings (a), (b), (c), and (d), respectively. The scale bar in SEM images A, B, C reflects 2 μm; the scale bar in SEM images D reflects 1 μm.

SEM A is a silver coated aluminum powder according to comparative example 1.

SEM B is an aluminum powder coated with a silver ion coordinating layer and then coated with a silver layer, according to comparative example 2.

SEM C is an aluminum powder coated with a dielectric layer and a silver layer, according to comparative example 3.

SEM D is an aluminum powder coated with a dielectric layer, a silver ion coordinating layer and a silver layer, according to example 28.

EXAMPLES

Figure 1:
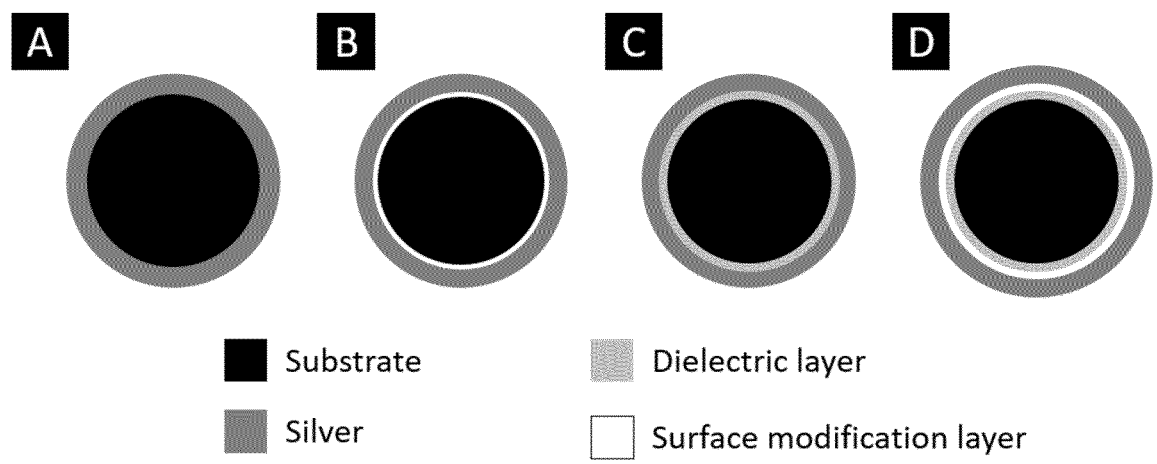

1. Preparations of Examples and Comparative Examples 1.1 Comparative Examples 1.1.1 Al—Ag (Comparative Example 1)

50 g of the aluminum powder ($d_{50}=20$ μm) were dispersed in 183 g ethanol in a 1 L double-wall glass reactor equipped with a stirrer (250 rpm) and a condenser. The dispersion was heated below the boiling point of the solvent. Subsequently, 29.3 g glucose dissolved in 32.40 g water and 8.5 g diethanolamine were added (each solution as one batch). After dispersing for 5 min, 13.8 g silver nitrate (equals 15% Ag) dissolved in 6.4 g water were added over 15 min. The dispersion was stirred for 1 h. After cooling down to room temperature, the silver-coated aluminum was filtered and washed twice with water (250 ml each) and ethanol (250 ml each), respectively. The resulting material was dried under vacuum for 5 h.

1.1.2 Al-MTMO-Ag (Comparative Example 2; One-Pot Synthesis in Contrast to Method Described in Wang Y. et al., "Surface Thiolation of Al Microspheres to Deposit Thin and Compact Ag Shells for High Conductivity", Langmuir 2015, 31, 13441-14451.)

50 g of the aluminum powder ($d_{50}=20$ μm) were dispersed in 183 g ethanol in a 1 L double-wall glass reactor equipped with a stirrer (250 rpm) and a condenser. The dispersion was heated below the boiling point of the solvent. 0.25 g 3-mercapto propyltrimethoxysilane (MTMO) were added and the mixture was stirred for 2 h. 29.3 g glucose dissolved in 32.40 g water and 8.5 g diethanolamine were added (each solution as one batch). After dispersing for 5 min, 13.8 g silver nitrate (corresponding to 15 wt-% Ag) dissolved in 6.4 g water were added over 15 min. The dispersion was stirred for 1 h. After cooling down to room temperature, the silver-coated aluminum was filtered, washed with water (2 times, 250 ml each) and ethanol (2 times, 250 ml each). The resulting material was dried under vacuum for 5 h.

1.1.3 Al—SiO$_2$—Ag (Comparative Example)

1.1.3.1 Al—SiO$_2$ (Comparative Examples 12-14)

240 g of the aluminum powder ($d_{50}=20$ μm) were dispersed in 293 g ethanol in a 1 L double-wall glass reactor equipped with a stirrer (250 rpm) and a condenser. After addition of 17.64 g tetraethoxysilane (corresponding to 2 wt-% SiO$_2$) the mixture was heated below the boiling point of the solvent. Subsequently, 4.5 g NH$_3$ (25% in water) and 20 g water were added in one batch. After 3 h of further stirring, the product was cooled to room temperature, filtered and washed with ethanol (3 times, 100 ml each). For further experiments the material was directly used in paste form.

Starting materials with $d_{50}=5$ μm (comparative example 14) and $d_{50}=45$ μm (comparative example 13) were also coated with SiO$_2$.

TABLE 1

Coating of substrates with dielectric layer based on 240 g starting material.

| Comparative examples | $d_{50}$, μm | SiO$_2$ % | Tetraethoxysilane/ g | NH$_3$ (25%)/ g | Water/ g |
|---|---|---|---|---|---|
| 12a | 20 | 2 | 17.6 | 4.5 | 20 |
| 13a | 45 | 2 | 17.6 | 4.5 | 20 |
| 14a | 5 | 2 | 17.6 | 4.5 | 20 |

1.1.3.2 Al—SiO$_2$—Ag (Comparative Examples 3-11)

The material prepared in section 1.1.3.1 was coated with silver according to section 1.1.1.

By adapting the amounts of silver nitrate, glucose and diethanolamine and the dosage rate, materials with other silver contents (10-40 wt.-%) were prepared (see table 2). Additionally, silver coatings on coarser ($d_{50}=45$ μm) and finer ($d_{50}=5$ μm) SiO$_2$-coated aluminum particles were carried out.

TABLE 2

Silver-coating of SiO$_2$-coated substrates based on 50 g starting material.

| Comparative Ex. | d$_{50}$ (Al-core)/ μm | SiO$_2$ [wt-% ref. to Al] | Ag [wt-% ref. to Al] | Glucose/ g | DEA/ g | AgNO$_3$,/ g |
|---|---|---|---|---|---|---|
| 3 | 20 | 2 | 15 | 29.3 | 8.5 | 13.9 |
| 4 | 20 | 2 | 20 | 41.7 | 12.2 | 19.7 |
| 5 | 20 | 2 | 30 | 72.1 | 21 | 34.0 |
| 6 | 45 | 2 | 10 | 18.5 | 5.4 | 8.7 |
| 7 | 45 | 2 | 15 | 29.3 | 8.5 | 13.9 |
| 8 | 5 | 2 | 15 | 29.3 | 8.5 | 13.9 |
| 9 | 5 | 2 | 20 | 41.7 | 12.2 | 19.7 |
| 10 | 5 | 2 | 30 | 72.1 | 21 | 34.0 |
| 11 | 5 | 2 | 40 | 111.3 | 32.5 | 52.5 |

1.1.4 Electrically Conductive Particles According to Wang Y. et al., "Surface Thiolation of Al Microspheres to Deposit Thin and Compact Ag Shells for High Conductivity", Langmuir 2015, 31, 13441-14451)

1.1.4.1 Al-MTMO (Comparative Examples 15a, 16a)

40 g of the starting material (d$_{50}$=20 μm) were dispersed either in 200 ml ethanol and 600 ml water (comparative example 15) or in 400 ml ethanol and 400 ml water (comparative example 16) in 1 L double-wall glass reactors equipped with stirrers (250 rpm) and condensers. 20 g 3-mercapto propyltrimethoxysilane (equals 33% MTMO) were added to each experiment and the mixtures were heated under reflux. After further stirring for 6 h a the materials were cooled to room temperature, filtered and washed with ethanol (3 times, 100 ml each). The products were dried under vacuum for 4 h at 60° C.

1.1.4.2 Al-MTMO-Ag (Comparative Examples 17, 18)

The materials prepared in section 1.1.4.1 were coated with silver. 30 g of the MTMO-modified material were dispersed in 110 g ethanol in a 1 L double-wall glass reactor equipped with a stirrer (250 rpm) and a condenser. The dispersion was heated below the boiling point of the solvent. Subsequently, 25 g glucose dissolved in 27.60 g water and 7.3 g diethanolamine were added separately. After dispersing for 5 min, 11.8 g silver nitrate (corresponding to 20 wt.-% Ag) dissolved in 5.5 g water were added over 60 min. The dispersion was stirred for 1 h. After cooling down to room temperature, the silver-coated aluminum was filtered, washed twice with water (250 ml each) and ethanol (250 ml each), respectively. The resulting material was dried under vacuum at room temperature for 5 h.

Comparative example 17 was prepared by silver-coating comparative example 15 and likewise comparative example 18 corresponds to comparative example 16.

1.2 Examples According to the Invention 1.2.1 Al—Sio$_2$-MTMO-Ag 1.2.1.1 Al—SiO$_2$-MTMO (Examples 19a-23a)

240 g aluminum powder (d$_{50}$=20 μm) were dispersed in 293 ethanol in a 1 L double-wall glass reactor equipped with a stirrer (250 rpm) and a condenser. After addition of 17.64 g tetraethoxysilane (corresponding to 2 wt.-% SiO$_2$) the mixture was heated below the boiling point of the solvent. Subsequently, 4.5 g NH$_3$ (25% in water) and 20 g water were added in one batch. After 2 h of further stirring, 1.2 g 3-mercapto propyltrimethoxysilane (equals 0.5 wt.-% MTMO) were added and the mixture was stirred for 1 h. Finally, the product was cooled to room temperature, filtered and washed with ethanol (3 times, 100 ml each). For further experiments the material was directly used in paste form.

The 3-mercapto propyltrimethoxysilane content in the final product was varied between 0.5 wt.-% and 1 wt.-% by adjusting the 3-mercapto propyltrimethoxysilane amount added to the reaction mixture. The above mentioned instructions were transferred to aluminum particles with other particle sizes (5 μm, 45 μm). The corresponding examples 19-23 are summarized in table 3.

TABLE 3

Coating of aluminum powder with dielectric layer and interlayer based on 240 g starting material.

| # | d$_{50}$, μm | SiO$_2$ wt.-% | MTMO wt.-% | MTMO/ g | Tetraethoxy-Silane/g | NH$_3$ (25%)/ g | Water/ g |
|---|---|---|---|---|---|---|---|
| 19 | 20 | 2 | 0.5 | 1.2 | 17.6 | 4.5 | 20 |
| 20 | 20 | 2 | 1.0 | 2.4 | 17.6 | 4.5 | 20 |
| 21 | 45 | 2 | 0.5 | 1.2 | 17.6 | 4.5 | 20 |
| 22 | 5 | 2 | 0.5 | 1.2 | 17.6 | 4.5 | 20 |
| 23 | 5 | 2 | 1.0 | 2.4 | 17.6 | 4.5 | 20 |

1.2.1.2 Al—SiO$_2$-MTMO-Ag (Examples 24-34)

The material prepared in section 1.2.1.1 was coated with silver according to section 1.1.1.

By adapting the amounts of silver nitrate, glucose and diethanolamine and the dosage rate, materials with other silver contents (5-40 wt.-%) were prepared. Additionally, silver coatings on coarser (d$_{50}$=45 μm) and finer (d$_{50}$=5 μm) aluminum particles were carried out. In all examples the MTMO concentration used was 0.5 wt.-% referred to Al.

TABLE 4

Silver coating of SiO$_2$-interlayer-coated substrates based on 50 g starting material.

| Examples | d$_{50}$/ μm | SiO$_2$ [wt.-%] | Ag [wt.-%] | Glucose/ g | DEA/ g | AgNO$_3$/ g |
|---|---|---|---|---|---|---|
| 24 | 45 | 2 | 5 | 8.7 | 2.5 | 4.1 |
| 25 | 45 | 2 | 10 | 18.5 | 5.4 | 8.7 |
| 26 | 45 | 2 | 15 | 29.5 | 8.6 | 13.9 |
| 27 | 45 | 2 | 20 | 41.8 | 12.2 | 19.7 |
| 28 | 25 | 2 | 15 | 29.5 | 8.6 | 13.9 |
| 29 | 25 | 2 | 20 | 41.8 | 12.2 | 19.7 |
| 30 | 25 | 2 | 30 | 72.2 | 21 | 34.0 |
| 31 | 5 | 2 | 15 | 29.5 | 8.6 | 13.9 |
| 32 | 5 | 2 | 20 | 41.8 | 12.2 | 19.7 |
| 33 | 5 | 2 | 30 | 72.2 | 21 | 34.0 |
| 34 | 5 | 2 | 40 | 111.4 | 32.5 | 52.5 |

1.2.2 Al—SiO$_2$-AMEO-Ag 1.2.2.1 Al—SiO$_2$-AMEO (Examples 35a-38a)

240 g aluminum powder (d$_{50}$=5 μm) were dispersed in 293 ethanol in a 1 L double-wall glass reactor equipped with a stirrer (250 rpm) and a condenser. After addition of 17.64 g tetraethoxysilane (corresponding to 2 wt.-% SiO2) the mixture was heated below the boiling point of the solvent. Subsequently, 4.5 g NH3 (25% in water) and 20 g water were added in one batch. After 2 h of further stirring, 1.2 g 3-aminopropyltriethoxysilane (equals 0.5 wt.-% AMEO) were added and the mixture was stirred for 1 h. Finally, the product was cooled to room temperature, filtered and washed with ethanol (3 times, 100 ml each). For further experiments the material was directly used in paste form.

The 3-aminopropyltriethoxysilane content in the final product was varied between 0.5 wt.-% and 4 wt.-% by adjusting the 3-aminopropyltriethoxysilane amount added to the reaction mixture. The corresponding examples 35a-38a are summarized in table 5.

TABLE 5

Coating of aluminum powder with dielectric layer and interlayer based on 240 g starting material.

| # | $d_{50}$, µm | SiO$_2$ wt.-% | AMEO wt.-% | AMEO/ g | Tetraethoxy-Silane/g | NH$_3$ (25%)/ g | Water/ g |
|---|---|---|---|---|---|---|---|
| 35a | 5 | 2 | 0.5 | 1.2 | 17.6 | 4.5 | 20 |
| 36a | 5 | 2 | 1.0 | 2.4 | 17.6 | 4.5 | 20 |
| 37a | 5 | 2 | 2.0 | 4.8 | 17.6 | 4.5 | 20 |
| 38a | 5 | 2 | 4.0 | 9.6 | 17.6 | 4.5 | 20 |

1.2.2.2 Al—SiO$_2$-AMEO-Ag (Examples 39-42)

50 g of the Al—SiO2-AMEO aluminum powder ($d_{50=5}$ µm) were dispersed in 183 g ethanol in a 1 L double-wall glass reactor equipped with a stirrer (250 rpm) and a condenser. The dispersion was heated below the boiling point of the solvent. Subsequently, 111.3 g glucose dissolved in 120 g water and 32.5 g diethanolamine were added (each solution as one batch). After dispersing for 5 min, 52.5 g silver nitrate (equals 40% Ag) dissolved in 25 g water were added over 15 min. The dispersion was stirred for 1 h. After cooling down to room temperature, the silver-coated aluminum was filtered and washed twice with water (250 ml each) and ethanol (250 ml each), respectively. The resulting material was dried under vacuum for 5 h.

The corresponding examples 39-42 are summarized in table 6.

TABLE 6

Silver-coating of SiO$_2$-coated substrates based on 50 g starting material.

| Ex. | $d_{50}$/ µm | SiO$_2$ [wt-%] | Ag [wt-%] | Glucose/g | DEA/g | AgNO$_3$, /g |
|---|---|---|---|---|---|---|
| 39 | 5 | 2 | 40 | 111.3 | 32.5 | 52.5 |
| 40 | 5 | 2 | 40 | 111.3 | 32.5 | 52.5 |
| 41 | 5 | 2 | 40 | 111.3 | 32.5 | 52.5 |
| 42 | 5 | 2 | 40 | 111.3 | 32.5 | 52.5 |

1.2.3 Al—SiO$_2$-VPSI363-Ag 1.2.3.1 Al—SiO$_2$-VPSI363 (Examples 43a-44a)

240 g aluminum powder (d50=5 µm) were dispersed in 293 g ethanol in a 1 L double-wall glass reactor equipped with a stirrer (250 rpm) and a condenser. After addition of 17.64 g tetraethoxysilane (corresponding to 2 wt.-% SiO2) the mixture was heated below the boiling point of the solvent. Subsequently, 4.5 g NH3 (25% in water) and 20 g water were added in one batch. After 2 h of further stirring, 2.4 g 3-mercaptopropyl-di(tridecan-1-oxy-13-penta(ethyleneoxide)) ethoxysilane (equals 1.0 wt.-% VPSI363) were added and the mixture was stirred for 1 h. Finally, the product was cooled to room temperature, filtered and washed with ethanol (3 times, 100 ml each). For further experiments the material was directly used in paste form.

The VPSI363 content in the final product was varied between 1.0 wt.-% and 4 wt.-% by adjusting the 3-aminopropyltriethoxysilane amount added to the reaction mixture. The corresponding examples 43a-44a are summarized in table 7.

TABLE 7

Coating of aluminum powder with dielectric layer and interlayer based on 240 g starting material.

| # | $d_{50}$, µm | SiO$_2$ wt.-% | VPSI363 wt.-% | VPSI363/ g | Tetraethoxy-Silane/g | NH$_3$ (25%)/ g | Water/ g |
|---|---|---|---|---|---|---|---|
| 43a | 5 | 2 | 1.0 | 2.4 | 17.6 | 4.5 | 20 |
| 44a | 5 | 2 | 4.0 | 9.6 | 17.6 | 4.5 | 20 |

1.2.3.2 Al—SiO$_2$-VPSI363-Ag (Examples 45-46)

50 g of the Al—SiO2-VPSI363 aluminum powder (d50=5 µm) were dispersed in 183 g ethanol in a 1 L double-wall glass reactor equipped with a stirrer (250 rpm) and a condenser. The dispersion was heated below the boiling point of the solvent. Subsequently, 111.3 g glucose dissolved in 120 g water and 32.5 g diethanolamine were added (each solution as one batch). After dispersing for 5 min, 52.5 g silver nitrate (equals 40% Ag) dissolved in 25 g water were added over 15 min. The dispersion was stirred for 1 h. After cooling down to room temperature, the silver-coated aluminum was filtered and washed twice with water (250 ml each) and ethanol (250 ml each), respectively. The resulting material was dried under vacuum for 5 h.

The corresponding examples 43-44 are summarized in table 8.

TABLE 8

Silver-coating of SiO$_2$-coated substrates based on 50 g starting material.

| Ex. | $d_{50}$/ µm | SiO$_2$ [wt-%] | Ag[wt-%] | Glucose/g | DEA/g | AgNO$_3$, /g |
|---|---|---|---|---|---|---|
| 45 | 5 | 2 | 40 | 111.3 | 32.5 | 52.5 |
| 46 | 5 | 2 | 40 | 111.3 | 32.5 | 52.5 |

2. Test Methods

2a. Silicon Dioxide Content of Pigments

The silicon dioxide content of the samples was determined gravimetrically. 1 g of the sample was dissolved in 25 ml hydrochloric acid. The supernatant was evaporated in boiling heat. After the sample was filtrated and washed with water, the residue was treated at 800° C. for 1 h and weighted. The SiO$_2$ content was determined with IPC as amount of Si and calculated as SiO$_2$.

2b. Silver Content

The silver content of the samples was determined gravimetrically. 1 g of the silver coated aluminum powder were mixed with 20 ml nitric acid and dissolved in boiling heat. After filtration, silver was precipitated as silver chloride from the filtrate with an aqueous sodium chloride solution (100 g NaCl in 1 L of water). After filtration, the precipitate was washed with water, dried and weighted. The Ag content was determined with ICP.

2c. Particle Size Distribution

Particle size distributions an especially the $d_{50}$ value of (coated) Aluminum powder were determined by laser diffraction (Sympatec—Helos/BF) as volume-averaged median of the particle size distribution curve. Dispersion of the dry particles took place in an airstream.

2d. Sysmex FPIA 3000S Measurement

Flow particle image analysis was carried out with an FPIA 3000S device from Sysmex Corporation. For measurement of particle size distribution and circularity, a homogeneous sample was deposited in the sample chamber. In the sample chamber the material is mixed with isopropanol (5 ml) and dispersed by application of ultrasound. After 1 min the sample is flushed across the camera lens to generate the corresponding contrast images of individual particles.

2e. Powder Resistivity

In order to determine the powder resistivity of electrically conductive granular materials, a defined amount of the sample was compacted in a cylindrical setup prior to determination of the resistivity between to contact points.

The custom-made setup consisted of the following parts: lab shaker, custom-made adapter for brass base, PVC tube, brass plunger with scale, additional weight (2 kg), contact clips, Milliohmmeter Resistomat® 2316 (Burster Präzisionsmesstechnik GmbH & Co. KG, Germany).

First, the PVC tube was attached to the brass base via a thread. Both parts were then attached to the lab shaker via the adapter. 30 g of each sample were loosened up until all visible agglomerates were broken up and filled into the PVC tube on the shaker. The brass plunger with scale was carefully lowered into the PVC tube and loaded with the additional weight. The material was compacted by shaking for 2 min at 1000 rpm. The scale on the brass plunger provided the filling height of the PVC tube before and after the compacting step. For the measurement of the electrical resistivity of the powder the contact clips were connected to the Resistomat and attached to brass base and plunger. The Resistomat® 2316 provided the corresponding resistivity values Rtotai:

$$R_{total} = R_{System} + R_{Sample}$$

$R_{system}$ corresponds to the resistivity of brass base and plunger and was determined to 0.18 mΩ.

The specific powder resistivity (in Ωcm) was then defined as:

$$R_{spec} = \frac{(R_{total} - R_{System}) * A}{d}$$

with d as filling height of the PVC tube after compacting (→plunger scale) and A as area of brass base. The specific powder resistivity is inverse proportional to the specific conductivity.

3. Results i. Conductivity: Comparative (Wang Y. et al. Vs. Inventive Example)

TABLE 9

Conductivity of the electrically conductive particles of the comparative examples (Wang Y. et al.) in comparison to electrically conductive particles of the examples according to the invention. MTMO amount with regard to Aluminum. Ag amount with regard to MTMO-coated material.

| Examples | $d_{50}$/ μm | $SiO_2$/ wt.-% | MTMO/ wt.-% | Ag/ wt.-% | $R_{spec}$/ mΩcm |
|---|---|---|---|---|---|
| comparative example 17 | 20 | — | 33 | 20 | 4.0 |
| comparative example 18 | 20 | — | 33 | 20 | 1.2 |
| comparative example 4 | 20 | 2 | — | 20 | 1.5 |
| example 29 | 20 | 2 | 0.5 | 20 | 0.9 |

Preparation of comparative examples 17 and 18 is described in section 1.1.4.2. Preparation of comparative example 4 is described in section 1.1.3.2. Preparation of example 29 was carried out according to section 1.2.1.2 with increased silver content of 20 wt.-%.

The material according to the invention (example 4) provides improved conductivity compared to the comparative examples 17 and 18. Additionally, production costs for materials according to the invention are reduced due to the reduced amount of MTMO.

4. Influence of Particle Properties on Conductivity

TABLE 10

Conductivity of silver-coated Aluminum particles with varying particle properties (silver content, particle size, dielectric layer, silver ion coordinating layer).

| Ex. | Preparation according to section: | $d_{50}$/ μm | $SiO_2$/ wt.-% | Silver ion coordinating layer | Silver ion coordinating layer/ wt.-% | Ag/ wt.-% | $R_{spec}$/ mΩcm |
|---|---|---|---|---|---|---|---|
| comparative example 1 | 1.1.1 | 20 | 0 | | 0 | 15 | 811 |
| comparative example 2 | 1.1.2 | | | MTMO | 0.5 | 15 | 5.0 |
| comparative example 6 | 1.1.3.2 | 45 | 2 | | 0 | 10 | 1.7 |
| comparative example 7 | | | | | | 15 | 1.0 |
| example 24 | 1.2.1.2 | | | MTMO | 0.5 | 5 | 5.5 |
| example 25 | | | | MTMO | | 10 | 1.6 |
| example 26 | | | | MTMO | | 15 | 0.9 |
| example 27 | | | | MTMO | | 20 | 0.9 |
| comparative example 3 | 1.1.3.2 | 20 | 2 | | 0 | 15 | 4.0 |
| comparative example 4 | | | | | | 20 | 1.5 |
| comparative example 5 | | | | | | 30 | 1.0 |
| example 28 | 1.2.1.2 | | | MTMO | 0.5 | 15 | 1.4 |
| example 29 | | | | MTMO | | 20 | 0.9 |
| example 30 | | | | MTMO | | 30 | 0.7 |

TABLE 10-continued

Conductivity of silver-coated Aluminum particles with varying particle properties (silver content, particle size, dielectric layer, silver ion coordinating layer).

| Ex. | Preparation according to section: | $d_{50}$/ μm | $SiO_2$/ wt.-% | Silver ion coordinating layer | Silver ion coordinating layer/ wt.-% | Ag/ wt.-% | $R_{spec}$/ mΩcm |
|---|---|---|---|---|---|---|---|
| comparative example 8 | 1.1.3.2 | 5 | 2 | | 0 | 15 | n.a. |
| comparative example 9 | | | | | | 20 | n.a. |
| comparative example 10 | | | | | | 30 | 22.8 |
| comparative example 11 | | | | | | 40 | 1.7 |
| example 31 | 1.2.1.2 | | | MTMO | 0.5 | 15 | n.a. |
| example 32 | | | | MTMO | | 20 | 14.3 |
| example 33 | | | | MTMO | | 30 | 1.7 |
| example 34 | | | | MTMO | | 40 | 1.0 |
| example 39 | 1.2.2.2 | 5 | 2 | AMEO | 0.5 | 40 | 3.6 |
| example 40 | 1.2.2.2 | | | AMEO | 1.0 | 40 | 3.5 |
| example 41 | 1.2.2.2 | | | AMEO | 2.0 | 40 | 3.9 |
| example 42 | 1.2.2.2 | | | AMEO | 4.0 | 40 | 1.9 |
| example 45 | 1.2.3.2 | 5 | 2 | VPSI363 | 1.0 | 40 | 2.2 |
| example 46 | 1.2.3.2 | | | VPSI363 | 4.0 | 40 | 2.0 | n.a. = powder resistivity too high to be measured with measurement device = material not conductive.

Figure 2:
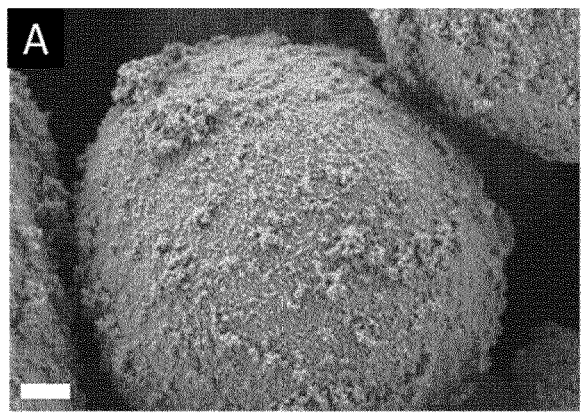
Figure 2:
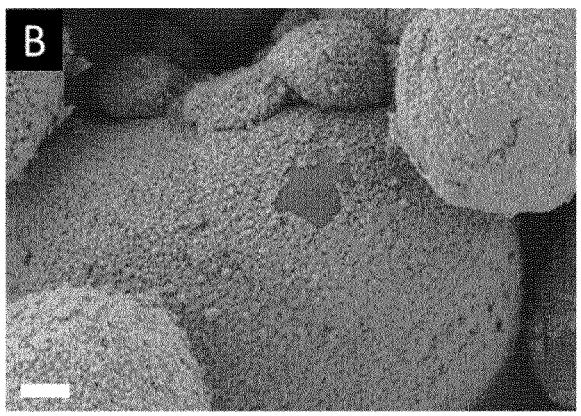
Figure 2:
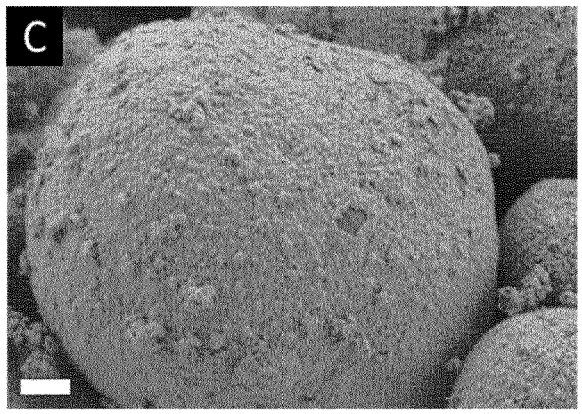
Figure 2:
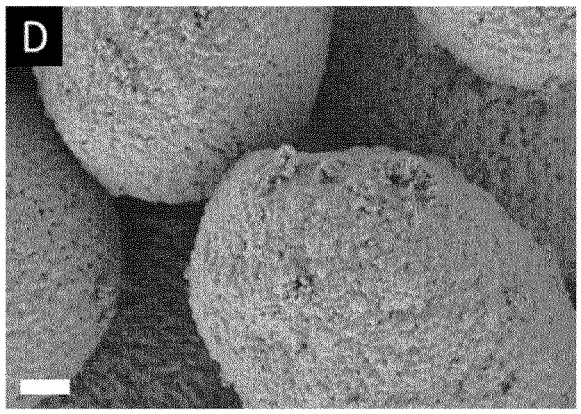

Discussion of Results Referring to Tables 9 and 10:

The comparative examples 1 and 2 essentially reproduced the findings of Wang et al. in the sense that the conductivity of silver coated aluminum powder can be significantly increased by the use of an interlayer of mercapto silane (0.5% MTMO); see FIG. 1B. Comparing the SEM pictures of the particles of FIGS. 2A and B a smoother Ag-layer can be observed in case of FIG. 2B, i.e. the interlayer pigment.

A comparison of the conductivities of comparative examples 1 and 3 show a significant increase of the conductivity by the silica interlayer (see table 10). Comparing the SEM pictures of FIG. 2A (comp. example 1) to FIG. 2C (comp. example 3) show a more homogeneous coating of the Al/SiO$_2$/Ag system.

If one compares the conductivities of example 28 with the conductivities of the comparative examples 1 to 3 (all systems are 20 μm spherical Al-shot coated with 2 wt.-% SiO$_2$ and 15 wt.-% Ag) it can be seen that the example 28 has the highest conductivity. Thus the interlayer coating of first silica and then mercaptosilane according to the present invention exhibits a synergetic effect on the conductivity. Additionally much less mercaptosilane is needed as in the experiments of Wang et al.

Similar results are obtained for 20 μm Al-shot coated according to the method of Wang et al (comparative examples 17 and 18, see table 9) with a solely SiO$_2$ coated Al-shot (comparative example 4) and the inventive example 29, which again exhibits the highest conductivity (0.9 mΩ cm) of this series. In comparative examples 17 and 18 the statement of Wang et al. that the ratio of the ethanol/water solvent in the coating step of the Al-core with MPTMS could be verified, but a much better conductivity was achieved with the inventive pigments.

Comparing further the conductivities of the particles according to this invention with Ag/SiO$_2$/Al systems always a higher conductivity is obtained for the inventive particles. Directly comparable samples in table 10 are for instance example 33 with comparative example 10 (5 μm Al-shot; 30 wt.-% Ag) and example 34 with comparative example 11 (5 μm Al-shot; 40 wt.-% Ag) and example 26 (45 μm Al-shot; 15 wt.-% Ag) with comparative example 7 (45 μm Al-shot; 15 wt.-% Ag). Comparing the SEM picture of FIG. 2D (coating according to this invention) with all other pictures from FIG. 2A to C the pigments according to FIG. 2D exhibit the most uniform coating with lowest amount of secondary precipitations.

Figure 3:
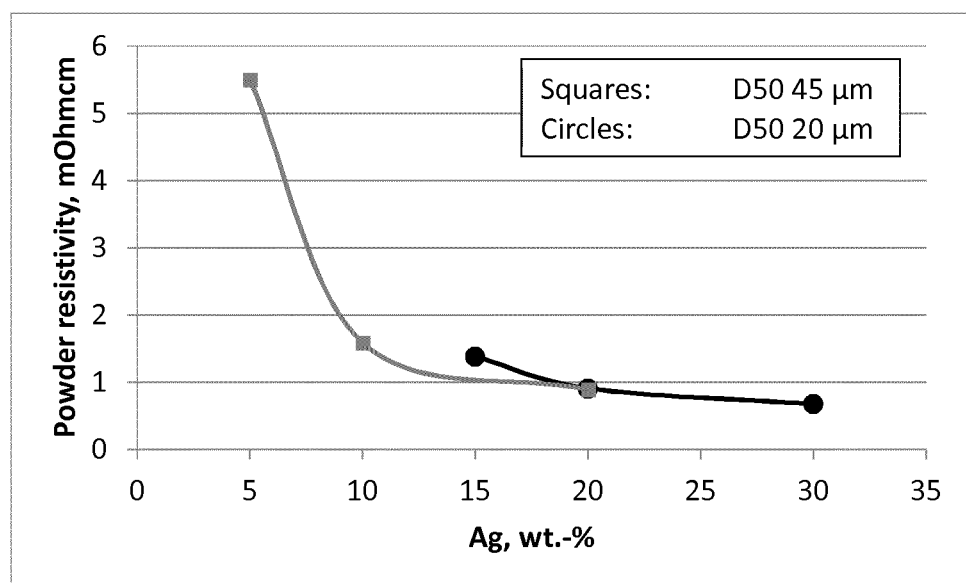
FIG. 3 is a plot showing the powder resistivity depending on the silver content of electrically conductive particles of the invention wherein the aluminum core particles have a $d_{50}=45$ μm (squares) and $d_{50}=20$ μm (circles).

Due to its higher efficiency the silver content of the pigments according to this invention can be reduced. For example, the pigment of example 28 (15 wt.-% Ag) has a similar conductivity compared to comparative example 4. Likewise the pigment of example 29 (20 wt.-% Ag) has a similar conductivity compared to comparative example 5. This reduction of the silver content means a significant reduction of costs for the inventive pigments. The dependence of the powder resistivity on the amount of silver is shown for inventive particles having core shots with a $d_{50}$=45 μm and 20 μm in FIG. 3. For the 20 μm core a significant non-linear dependence is seen with a lower resistance with increasing amount of silver. For the 45 μm shot no significant dependence is seen. Here the specific surface of the core material is the lowest and thus the critical thickness of the Ag layer to impart high conductivity is reached at lower amounts than in case of finer shots.

Figure 4:
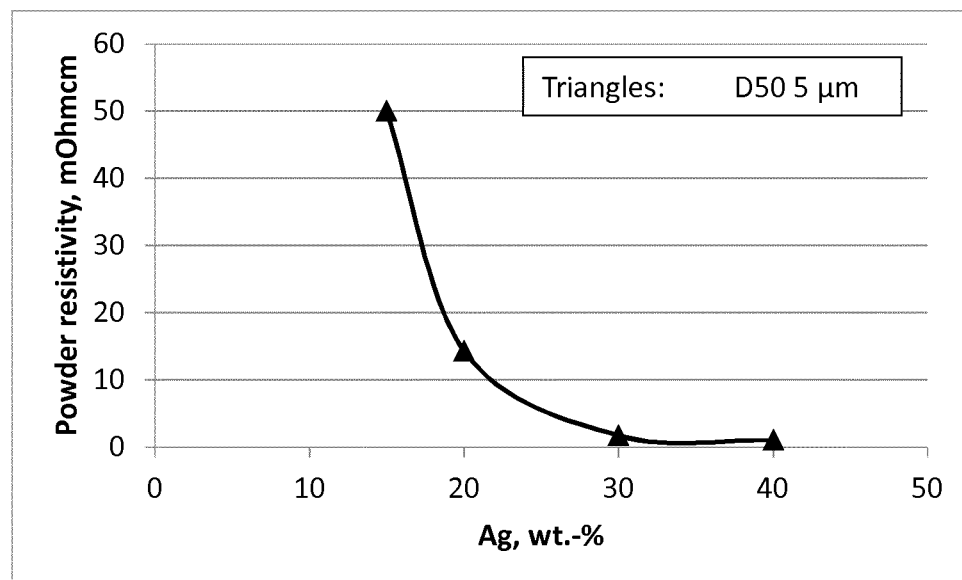
FIG. 4 is a plot showing the powder resistivity depending on the silver content of electrically conductive particles of the invention wherein the aluminum core particles have a $d_{50}=5$ μm (triangles).

Regarding fine pigments ($d_{50}$=5 μm) the inventive example 32 (20 wt.-% Ag) had a conductivity of 14.6 mΩcm whereas no conductivity could be measured for the corresponding Al/SiO$_2$/Ag system of comparative example 9. The strong dependence of the powder resistivity on the amount of silver is shown for inventive particles with a core shot of $d_{50}$=5 μm in FIG. 4.

The invention claimed is:

1. Electrically conductive particles comprising metallic cores, a dielectric layer encapsulating the metallic cores, a silver containing outer-layer, and a silver ion coordinating layer arranged between the dielectric layer and the silver containing outer-layer,
   wherein the metallic cores comprise one or more of elemental aluminum, elemental copper, elemental iron, elemental nickel, elemental zinc, aluminum alloy, copper alloy, iron alloy, nickel alloy, zinc alloy, aluminum oxide, copper oxide, iron oxide, nickel oxide, and zinc oxide,
   the dielectric layer comprises one or more of an organic polymer and a metal oxide, the metal oxide including one or more of silicon oxide, aluminum oxide, titanium oxide, zirconium oxide, and tin oxide, and the silver containing outer-layer includes a continuous and opaque layer,
   the dielectric layer includes a silicon oxide layer, and
   the metallic cores have a median diameter $d_{50}$ in the range of 2 μm to 100 μm.

2. The electrically conductive particles according to claim 1,
   wherein the silver ion coordinating layer includes one or more of an organofunctional silane comprising a silver ion coordinating moiety, an organofunctional titanate comprising a silver ion coordinating moiety, an organofunctional aluminate comprising a silver ion coordinating moiety, and an organofunctional zirconate comprising a silver ion coordinating moiety.

3. The electrically conductive particles according to claim 1,
   wherein the silver ion coordinating layer comprises at least one silane of formula (I):

wherein:
a is an integer selected from 1, 2, or 3,
b and c are independently selected integers from 0, 1, or 2, with the proviso that a+b+c is an integer from 1 to 3, R¹ is alkyl with 1 to 4 carbon atoms,
each R² independently represents a branched-chain having 1 to 14 carbon atoms, a straight chain alkylene having 1 to 14 carbon atoms, or a cycloalkylene having 5 to 11 carbon atoms, and each R³ and R⁴ independently represents a branched-chain alkyl having 1 to 14 carbon atoms, a straight chain alkyl having 1 to 14 carbon atoms, a cycloalkyl having 5 to 11 carbon atoms, or H, and X is a silver ion coordinating moiety.

4. The electrically conductive particles according to claim 3,
wherein the silver ion coordinating moiety X independently represents one or more of mercapto, thioalkylether having 1 to 6 carbon atoms, amino, thiosulfate, thiocyanate, cyanate, cyanide, ureido, carbamate, and bipyridyl.

5. The electrically conductive particles according to claim 1,
wherein the silver ion coordinating layer comprises one or more of mercapto silane, amino silane, and thiocyanate silane.

6. The electrically conductive particles according to claim 1,
wherein the silver ion coordinating layer comprises mercaptosilane.

7. The electrically conductive particles according to claim 1,
wherein the dielectric layer is present in an amount in a range of 0.5 to 15 wt.-%, based on the total weight of the metallic cores.

8. The electrically conductive particles according to claim 1,
wherein the dielectric layer comprises a hybrid mixture of silicon oxide and one or more of an organic oligomer and an organic polymer.

9. The electrically conductive particles according to claim 1,
wherein the dielectric layer includes a first sublayer comprising the silicon oxide layer, the silicon oxide layer comprising silicon dioxide, and a second sublayer comprising a polymer, wherein the second sublayer is located either directly on the first sublayer or between the silver ion coordinating layer and the first sublayer.

10. The electrically conductive particles according to claim 1,
wherein the silver containing outer-layer is present in an amount of 5 to 45 wt-%, based on the electrically conductive particles.

11. The electrically conductive particles according to claim 1,
wherein the electrically conductive particles have an electrical powder resistivity in a range of 0.2 to below 100 mΩ cm.

12. The electrically conductive particles according to claim 1,
wherein the metallic cores have one or more of a spherical form, plate-like form, and a dendritic form.

13. The electrically conductive particles of claim 1, wherein the particles further comprise an outer surface modification layer in amount of 0 to 3 wt.-%, based on the total weight of the electrically conductive particles.

14. The electrically conductive particles of claim 1, wherein the silver ion coordinating layer comprises one or more of 3-mercaptopropyl trimethoxysilane, mercaptopropyl methyl dimethoxysilane, 3-mercaptopropyl triethoxysilane, and 3-thiocyanatopropyl triethoxysilane.

15. The electrically conductive particles of claim 1, wherein the dielectric layer is present in an amount in a range of 0.5 to 15 wt. %, based on the total weight of the metallic core.

16. The electrically conductive particles of claim 1, wherein the $d_{50}$ of the metallic core is in the range from 3 μm to 85 μm.

17. The electrically conductive particles of claim 1, wherein the $d_{50}$ of the metallic core is in the range from 4 μm to 75 μm.

18. A method of manufacturing electrically conductive particles, the method comprising:
providing metallic core particles, the metallic core particles having a median diameter d50 in the range of 2 μm to 100 μm,
applying a dielectric layer on the metallic core particles, the dielectric layer including a silicon oxide layer,
applying a coordinating layer for silver ions on the dielectric layer,
contacting the coordinating layer of the coated particles with silver ions, the silver ions being provided by a silver compound dissolved in a solvent, to coordinate at least part of the silver ions on the coordinating layer, and
reducing the silver ions coordinated on the surface of the coordinating layer and reducing additional silver ions to provide a continuous and opaque silver containing layer on the coordinating layer.

19. The method of claim 18, further comprising applying an outer surface modification layer to the particles.

* * * * *